(12) United States Patent
Bright et al.

(10) Patent No.: US 7,612,737 B2
(45) Date of Patent: Nov. 3, 2009

(54) SCANNED LIGHT BEAM DISPLAY WITH BRIGHTNESS COMPENSATION

(75) Inventors: Gregory Scott Bright, Kirkland, WA (US); Scott W. Straka, Kirkland, WA (US); Philip C. Black, Woodbridge, CT (US); James G. Moore, Guilford, CT (US); John R. Lewis, Bellevue, WA (US); Hakan Urey, Redmond, WA (US); Clarence T. Tegreene, Redmond, WA (US)

(73) Assignee: Microvision, Inc., Redmond, WA (US)

( * ) Notice: Subject to any disclaimer, the term of this patent is extended or adjusted under 35 U.S.C. 154(b) by 538 days.

(21) Appl. No.: 11/393,161

(22) Filed: Mar. 28, 2006

(65) Prior Publication Data

US 2006/0164330 A1    Jul. 27, 2006

(51) Int. Cl.
*G09G 3/00* (2006.01)
(52) U.S. Cl. .............................. 345/32; 345/7; 345/77; 345/214; 345/589; 359/242; 359/630
(58) Field of Classification Search .................. 345/7, 345/204, 32, 77, 214, 505, 589, 593, 690; 348/68, 500, 51, 742, 750; 250/363.02, 205; 347/225, 230, 232; 359/201.1, 242, 462, 359/630; 358/505
See application file for complete search history.

(56) References Cited

U.S. PATENT DOCUMENTS

| | | | |
|---|---|---|---|
| 5,089,908 A | 2/1992 | Jodoin et al. | |
| 5,191,466 A | 3/1993 | Gross et al. | |
| 5,557,344 A * | 9/1996 | Chen | 348/809 |
| 5,570,222 A | 10/1996 | Chovan | |
| 5,654,817 A | 8/1997 | De Loor | |
| 5,694,237 A | 12/1997 | Melville | |
| 5,801,390 A | 9/1998 | Shiraishi | |
| 6,154,269 A * | 11/2000 | Ozawa | 355/53 |
| 6,245,590 B1 | 6/2001 | Wine et al. | |
| 6,333,724 B1 | 12/2001 | Taira et al. | |
| 6,344,906 B1 | 2/2002 | Gatto et al. | |
| 6,362,912 B1 * | 3/2002 | Lewis et al. | 359/204.1 |
| 6,448,996 B2 | 9/2002 | Suganuma | |
| 6,510,256 B1 | 1/2003 | Asseh et al. | |
| 6,522,365 B1 | 2/2003 | Levantovsky et al. | |
| 7,046,266 B1 * | 5/2006 | Retschke et al. | 347/239 |
| 2002/0008196 A1 | 1/2002 | Yamagishi et al. | |

FOREIGN PATENT DOCUMENTS

WO    WO-0020912    4/2000

* cited by examiner

*Primary Examiner*—Abbas I Abdulselam
(74) *Attorney, Agent, or Firm*—Kevin D. Wills

(57) ABSTRACT

A scanned beam display is operable to compensate for variations in apparent pixel brightness arising from variations in beam scanning velocity and/or pixel dwell times. A compensation circuit modifies pixel values according to their scanning velocity and/or dwell time.

19 Claims, 20 Drawing Sheets

SCANNED LIGHT BEAM DISPLAY WITH BRIGHTNESS COMPENSATION

BACKGROUND OF THE INVENTION

A variety of techniques are available for providing visual displays of graphical or video images to a user. For example, cathode ray tube type displays (CRTs), such as televisions and computer monitors are very common. Such devices suffer from several limitations. For example, CRTs are bulky and consume substantial amounts of power, making them undesirable for portable or head-mounted applications.

Flat panel displays, such as liquid crystal displays and field emission displays, may be less bulky and consume less power. However, typical flat panel displays utilize screens that are several inches across. Such screens have limited use in head mounted applications or in applications where the display is intended to occupy only a small portion of a user's field of view.

One approach to overcoming many limitations of conventional displays is a scanned beam display, such as that described in U.S. Pat. No. 5,467,104 of Furness et al., entitled VIRTUAL RETINAL DISPLAY, which is incorporated herein by reference. As shown in FIG. 1, in a scanned beam display 40, a scanning source 42 outputs a scanned beam of light that is coupled to a viewer's eye 44 by a beam combiner 46. In scanned displays, a scanner, such as a scanning mirror or acousto-optic scanner, scans a modulated light beam onto a viewer's retina. An example of such a scanner is described in U.S. Pat. No. 5,557,444 of Melville et al., entitled MINIATURE OPTICAL SCANNER FOR A TWO-AXIS SCANNING SYSTEM, which is incorporated herein by reference. The scanned light enters the eye 44 through the viewer's pupil 48 and is imaged onto the retina 59 by the cornea. In response to the scanned light the viewer perceives an image.

Sometimes such displays are used for partial or augmented view applications. In such applications, a portion of the display is positioned in the user's field of view and presents an image that occupies a region 43 of the user's field of view 45, as shown in FIG. 2A. The user can thus see both a displayed virtual image 47 and background information 49. If the background light is occluded, the viewer perceives only the virtual image 47, as shown in FIG. 2B.

One difficulty with such displays is raster pinch, as will now be explained with reference to FIGS. 3-5. As shown diagrammatically in FIG. 3, the scanning source 42 includes an optical source 50 that emits a beam 52 of modulated light. In this embodiment, the optical source 50 is an optical fiber that is driven by one or more light emitters, such as laser diodes (not shown). The emitted beam 52 strikes a turning mirror 54 and is directed toward a horizontal scanner 56. The horizontal scanner 56 is a mechanically resonant scanner that scans the beam 52 periodically in a sinusoidal fashion. The horizontally scanned beam then travels to a vertical scanner 58 that scans periodically to sweep the horizontally scanned beam vertically. Eye coupling optics 60 then couple the scanned beam 52 to an exit pupil expander 62 that provides an expanded exit pupil for viewing by a viewer's eye 64. One such expander is described in U.S. Pat. No. 5,701,132 of Kollin, et al., entitled VIRTUAL RETINAL DISPLAY WITH EXPANDED EXIT PUPIL, which is incorporated herein by reference. One skilled in the art will recognize that, for differing applications, the exit pupil expander 62 may be omitted or may have a variety of structures, including diffractive, reflective, or refractive designs. For example, the exit pupil expander 62 may be a planar or curved structure and may create any number or pattern of output beams in a variety of patterns.

Returning to the description of scanning, as the beam scans through each successive location in a plane 66, the beam color and intensity is modulated in a fashion to be described below to form a respective pixel of an image. By properly controlling the color and intensity of the beam for each pixel location, the display 40 can produce the desired image.

The respective waveforms of the vertical and horizontal scanners are shown in FIGS. 4A and B respectively. In the plane 66 (FIG. 3), the beam traces the pattern 68 shown in FIG. 5. As can be seen by comparing the actual scan pattern 68 to a desired raster scan pattern 70, the actual scanned beam 68 is "pinched" at the outer edges of the plane 66. That is, in successive forward and reverse sweeps of the beam, the pixels near the edge of the scan pattern are unevenly spaced. This uneven spacing can cause the pixels to overlap or can leave a gap between adjacent rows of pixels. Moreover, because image information is typically provided as an array of data, where each location in the array corresponds to a respective position in the ideal raster pattern 70, the displaced pixel locations can cause image distortion. Some approaches to addressing these issues are described in U.S. Pat. No. 6,140,979 of Gerhard, et al., entitled SCANNED DISPLAY WITH PINCH, TIMING, AND DISTORTION CORRECTION, which is incorporated herein by reference.

SUMMARY OF THE INVENTION

A scanning beam display includes a light source that emits a beam of light responsive to a driver signal from a driver circuit. The driver circuit responds to an image signal and a data clock from a clock generator circuit. The clock generator circuit accepts an input corresponding to a scanner position, velocity, acceleration, or frequency and produces the chirped signal in response.

In one embodiment, the clock circuit includes a digital signal synthesis circuit and a corresponding filter that produce the chirped signal. In one approach comparator produces a variable frequency data clock from the chirped signal.

In one approach, a proportional-integral-differential circuit operates to synchronize the chirped signal with the input corresponding to the scanner position, velocity, acceleration, or frequency. In another aspect, a frame buffer stores data corresponding to an image signal and the data is output according to the data clock derived from the chirped signal. Data from the frame buffer may also be directed to an alternative buffer to operate as a frame-grabber for a video display.

DETAILED DESCRIPTION OF THE INVENTION

Overview

As described in U.S. Pat. No. 6,140,979 of Gerhard et al., a scanned beam display includes red, green, and blue light sources, such as lasers or LEDs. The lasers or LEDs may be modulated directly or indirectly. Where the modulators are external to the light source, the light may be divided into a plurality of beams, each having a respective beam modulator.

One component of the display is an electronic control system that accepts video inputs from an image source and other signals, such as control or sense signals. Responsive to the video inputs and other signals, the control circuit produces output signals that drive the light sources or modulators as the case may be.

In one embodiment, the input signals are analog RGB signals with separate digital horizontal and vertical syncs corresponding to a typical screen format such as SXGA, having 1280 pixels ("pels")×1024 lines with 60 Hz refresh rate. In a non-interlaced format, the corresponding input dot clock is 108 MHz. Alternatively, the electronic control system may support a monochrome display mode that may be useful for applications such as military FLIR displays. In another alternative, the control system can support lower resolution non-interlaced formats using video interpolation of the incoming image together with up-scanning to SXGA levels. In still another alternative, the control system can support an HDTV resolution display with 1920 pels×1080 lines at 30 Hz. For consistency and clarity of presentation, the primary embodiment described herein is the SXGA, 1280×1024×60 Hz format.

In one current approach useful for computer based applications, the control system utilizes a conventional Compact PCI card format and electrical interface. An alternative may be a standard PCI (i.e. IBM-PC) format or the structure may be implemented in a more compact format using application specific circuitry or by reducing the number of components, such as modulators.

While the embodiment described herein employs five external modulators and beams, more or fewer modulators may be used, depending upon system considerations, such as the desired resolution, the performance of components such as the scanners, or power considerations.

Figure 1:
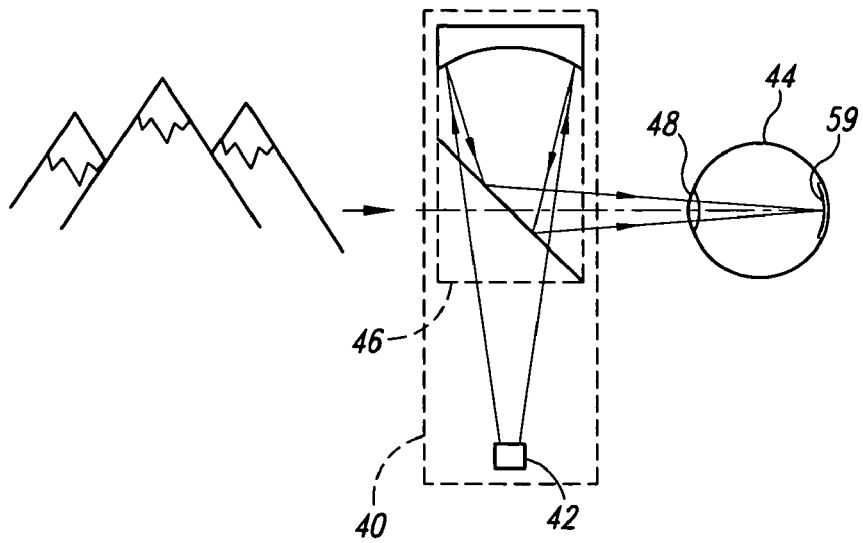
FIG. 1 is a diagrammatic view of an augmented display presenting a displayed image and a real-world image to a user's eye.
Figure 2A:
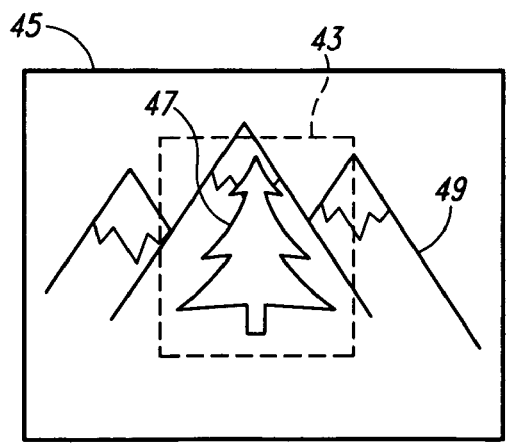
FIG. 2A is an overlay of a virtual image on a real world background.
Figure 2B:
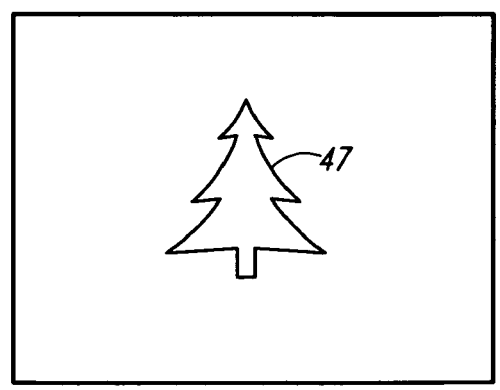
FIG. 2B is the virtual image of FIG. 2A with the real world background removed.
Figure 3:
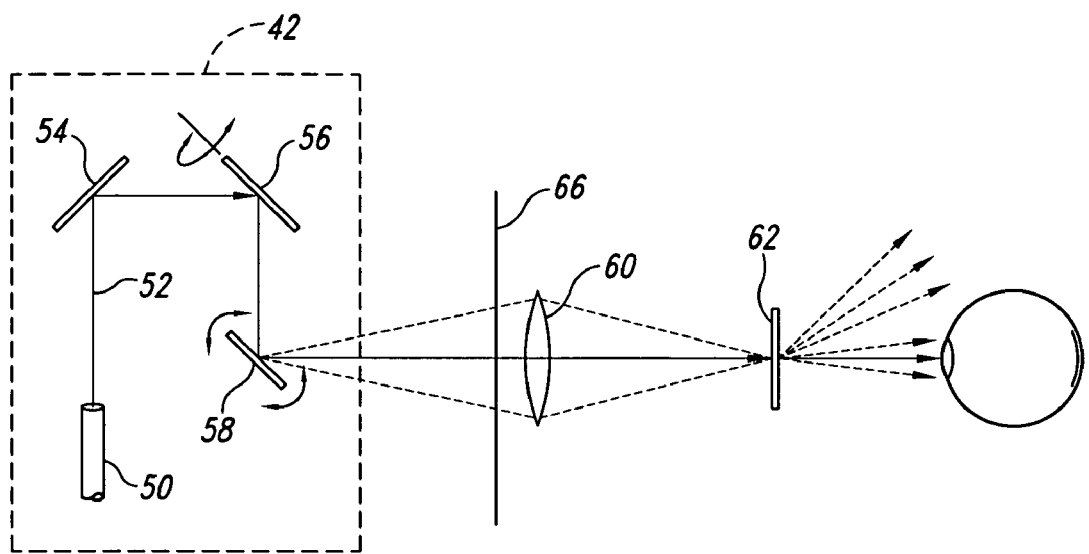
FIG. 3 is a diagrammatic view of a scanning beam display including an exit pupil expander.
Figure 4A:
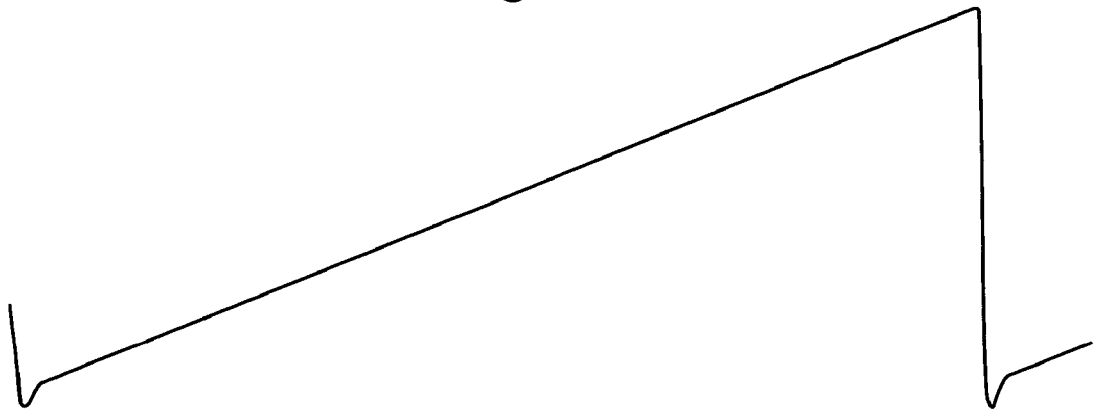
FIG. 4A is a signal timing diagram of a vertical scanner signal in a scanning beam display.
Figure 4B:
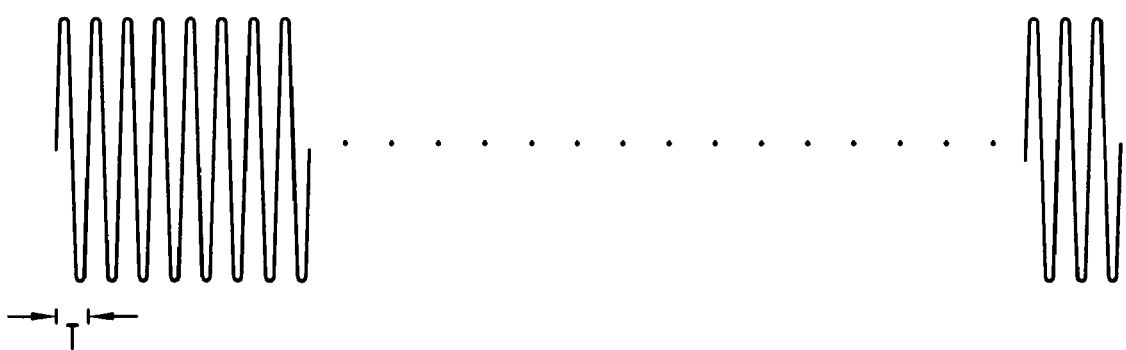
FIG. 4B is a signal timing diagram of a horizontal scanner signal in a scanning beam display.
Figure 5:
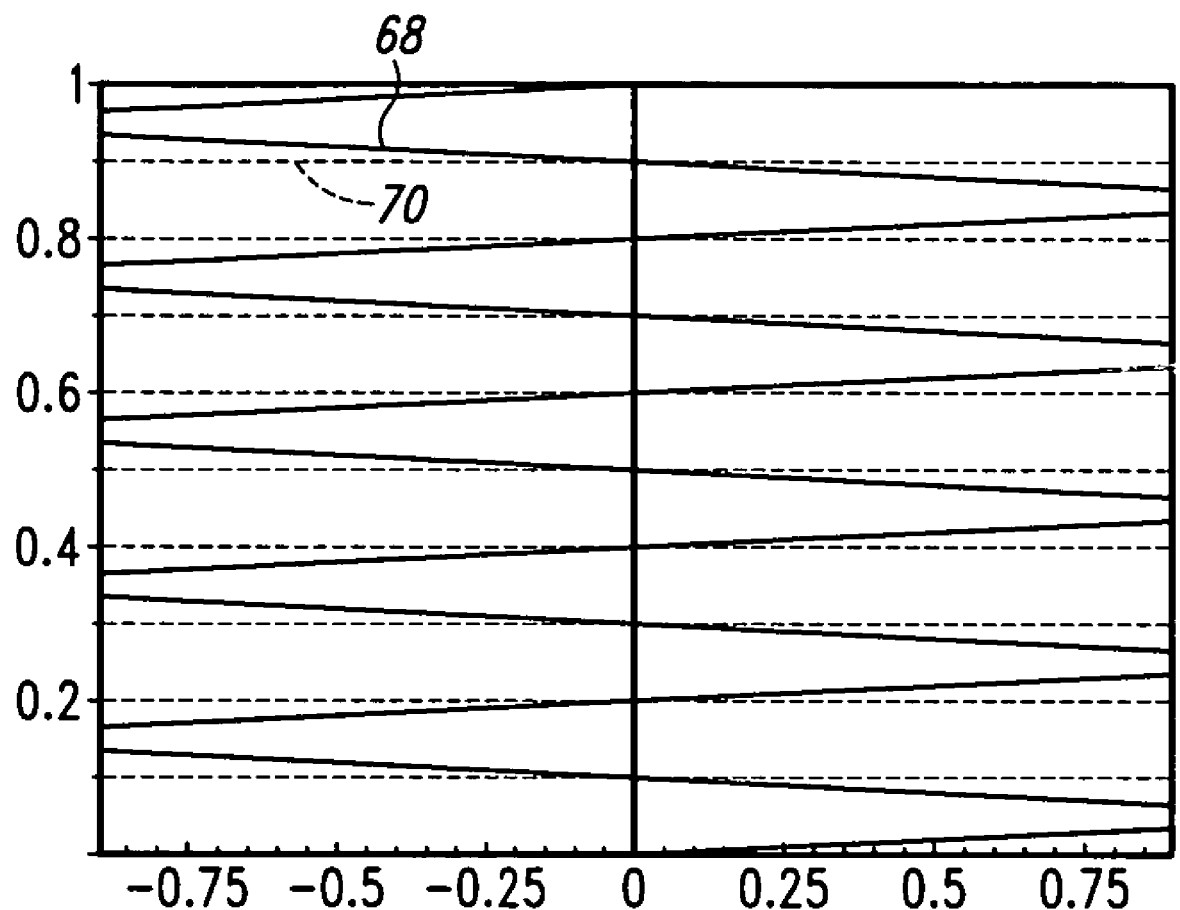
FIG. 5 is a simplified scanning pattern of a scanning beam display showing pinch relative to a desired scan pattern.
Figure 6:
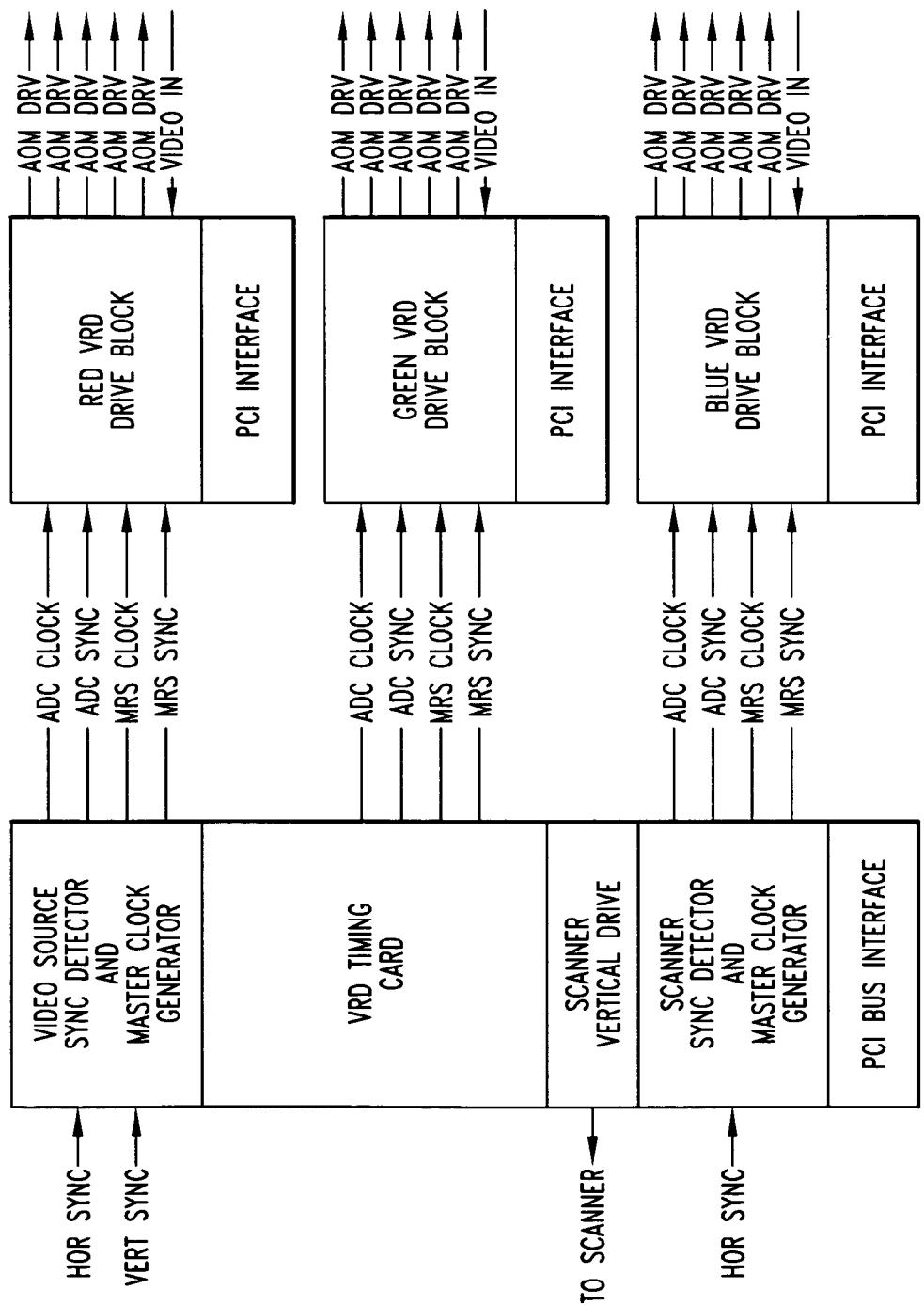
FIG. 6 is a system block diagram of various blocks and a scanning beam display control circuit.

FIG. 6 is a system block diagram showing two basic functional block types: a Timing block and a Drive block. While FIG. 6 presents one Timing block and three Drive blocks, it will be understood that a different number of each block may be used in certain configurations. For example, a two-line, monochrome system may include only two Drive blocks in certain systems.

Clock Generation and Synchronization

While clock generation can be a critical consideration in producing drive signals for a variety of high quality displays, the scanning beam display may impose additional constraints that can make clock generation more difficult.

In the Scanned Beam Display, a magnetically resonant scanner ("MRS") forms the principal horizontal scanner. One such MRS is described in U.S. Pat. No. 6,151,167 of Melville, which is incorporated herein by reference. While the MRS scanner is described herein, a variety of other scanners may be used. For example, the scanner may be a micromachined scanner, such as that described in U.S. Pat. No. 6,245,590 of Wine, et al., entitled FREQUENCY TUNABLE RESONANT SCANNER AND METHOD OF MAKING, which is commonly assigned herewith and is incorporated herein by reference.

To allow the scanner to operate at a frequency significantly below the SXGA line rate, the scanned beam display uses a plurality of sub-beams (presently five) to construct each color in the RGB display. The use of a plurality of light beams that share a common mirror for multi-line writing is described in U.S. Pat. No. 6,151,167 of Melville, entitled SCANNED DISPLAY WITH DUAL SIGNAL FIBER TRANSMISSION which is incorporated herein by reference and in U.S. patent Ser. No. 09/369,676 of Urey, entitled SCANNED DISPLAY WITH SWITCHED FEEDS AND DISTORTION CORRECTION, which is commonly assigned herewith and is incorporated herein by reference. While the U.S. Pat. No. 6,151,167 describes using a fiber to provide more than one beam from a common mirror, one skilled in the art will recognize that a plurality of beams can be aligned to a common mirror using a variety of optical techniques.

Figure 7:
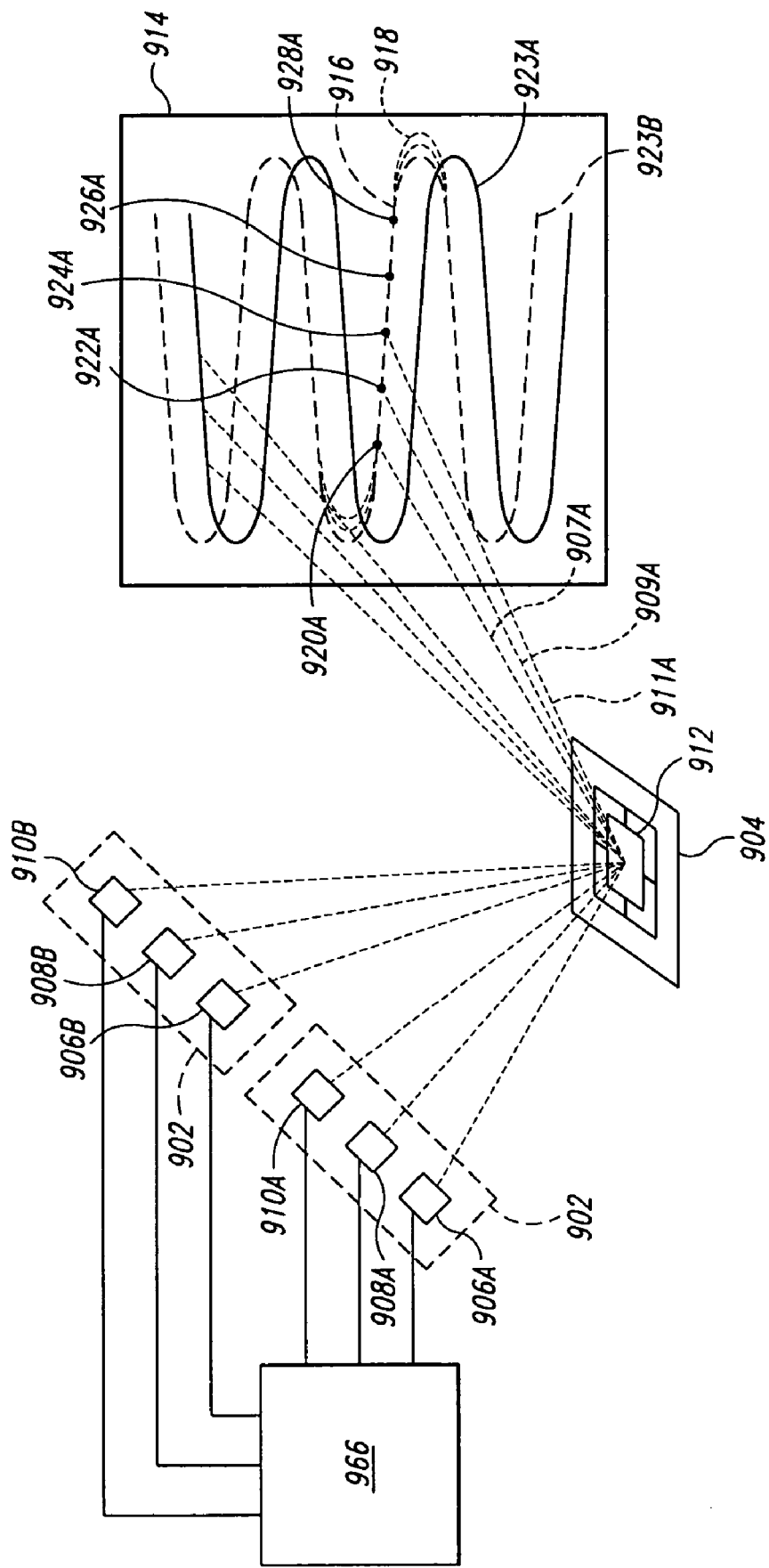
FIG. 7 is a diagrammatic view of a scanning beam display showing two pairs of a red, green, and blue light emitters directed toward a scanner and a corresponding set of scan patterns.

In one embodiment incorporating a plurality of beams, shown in FIG. 7, two emitter sets 902 are positioned near a scanning assembly 904, that is represented diagrammatically by a gimbal diagram. Each of the emitter sets 902 includes three separate light sources 906A,B, 908A,B, 910A,B and each of the light sources emits a respective beam of light toward a mirror 912 in the scanning assembly 904. In one approach the emitters 906A,B are red light emitters, 908A,B are green emitters, and 910A,B are blue emitters.

The light sources 906A, 908A, 910A are positioned and oriented to converge on the mirror 912 and are redirected toward an image field 914 by the mirror 912. The light sources are oriented such that they trace substantially overlapping raster patterns 916 that are slightly offset horizontally, as indicated by the broken lines 918. Consequently, at a given time t1, each of the beams of light 907A, 909A, 911A illuminate a respective point 920A, 922, A 924A in the image field 914. The spacing of the points 920A, 922A, 924A is exaggerated for clarity in the figure.

A short time later t2, as the mirror 912 pivots, each of the beams 907A, 909A, 911A moves along the respective scan path 916. At time t2, the leading beam 911A illuminates a point 926A and the second beam 909A illuminates the point 924A. The third beam 907A illuminates the point 922A.

At a third time t3, the beams move farther along the scan path 916 such that the first beam strikes a point 928A, the second beam strikes the point 926 at, and the third beam strikes the point 924A.

Figure 8:
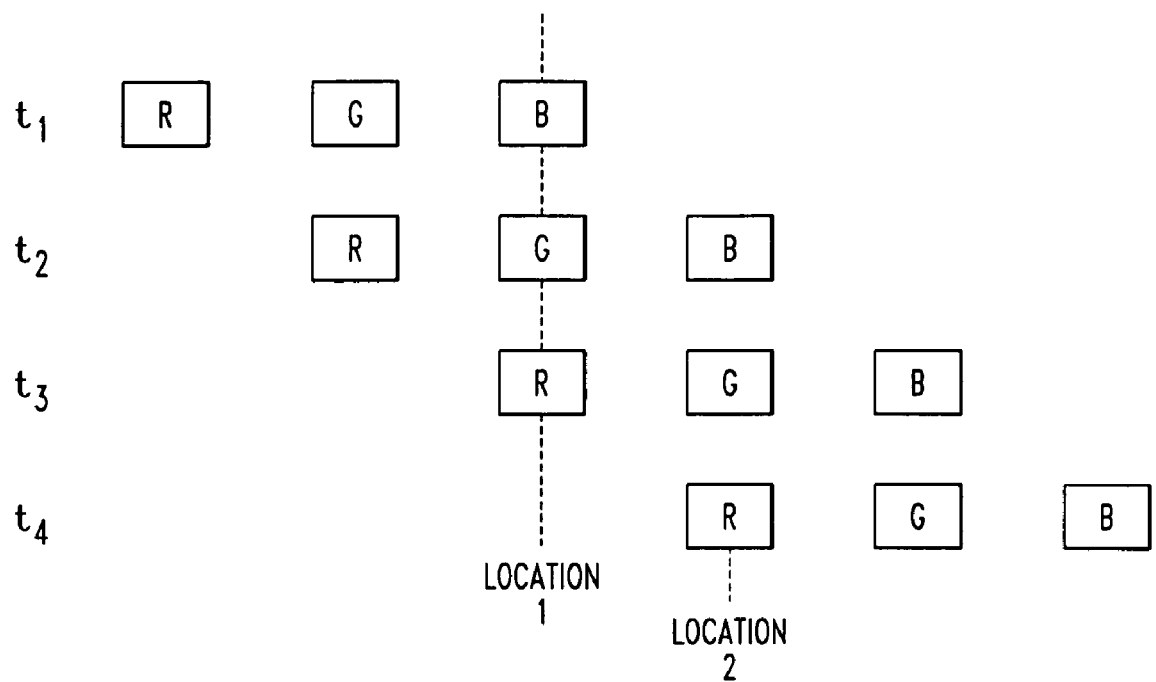
FIG. 8 is a diagrammatic timing view of serial combination of red, green, and blue components for selected pixels.

FIG. 8 shows diagrammatically the horizontal positioning of the beams 907A, 909A, 911A at the three points in time t1, t2, t3. As can be seen from the figure, the three beams 907A, 909A, 911A sequentially illuminate location 1 with red, green, and blue components. As is known, a viewer's eye will integrate the red, green, and blue components such that the viewer will perceive a pixel at location 1 heading and intensity and color content defined by the intensity and color content of the individual beams 907A, 909A, 911A, thereby producing an effectively color combined pixel.

As will be described below, an electronic controller 926 drives all of the light sources 906A,B, 908A,B, 910A,B. Because image data for each of the components of each of the pixels arrives at the display simultaneously, the electronic controller 926 selectively delays driving data to the light sources 908A,B, 910A,B relative to the data provided to the light source 906A, B such that the appropriate red green and blue components are output at the proper locations as described above with reference to FIG. 7.

Each of the light sources 906A, 908A, 910A and illuminates a subsequent location (Location 2) shortly after it illuminates the first location (Location 1). The beams thus time-sequentially illuminate location 2 to produce a second perceived color combined pixel displaced from the first.

In a similar fashion, the three light sources 906A, 908A, 910A illuminate a second scan path 922 in the image field 914 to produce a series of time-sequentially color combined pixels. However, the light sources 906A, 908A, 910A are positioned and offset such that the scan path 922 is vertically offset from the scan path 916. The two scan paths 916, 922 thus form an interlaced scanning pattern in the image field 914.

One skilled in the art will recognize that the time sequential color combination approach described previously may also be applied to a single set of light sources or to more than two sets of light sources, depending upon the desired system characteristics, complexity, and cost. Also, in some applications the colors may be combined using alternative approaches, such as common beam combiners, diffractive optical elements, or other approaches. Similarly, the beams may be interlaced, as described previously or may be tiled as described in U.S. patent application Ser. No. 09/369,676 of Urey.

Figure 9:
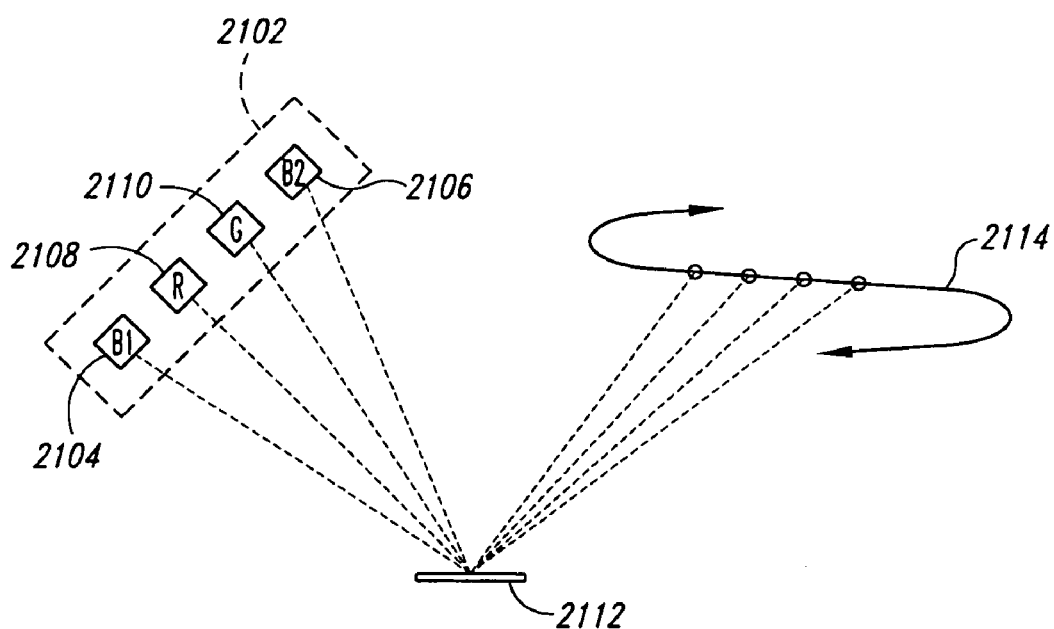
FIG. 9 is a diagrammatic view of combination of color components along a scan line.

Additionally, although the previously described embodiment includes a single red green and blue light source in each of the emitter sets 902, other combinations of light sources may be appropriate for certain applications. For example, as shown in FIG. 9, an emitter set 2102 includes two blue emitters 2104, 2106, a red emitter 2108, and a green emitter 2110. Each of the emitters is directed toward a scanning mirror 2112 that sweeps each of the beams through a respective scan pattern 2114. As described previously, in this configuration each of the scan patterns 2114 is slightly offset from the others, however, the scan patterns 2114 are represented as a single scan pattern for clarity of presentation.

Figure 10:
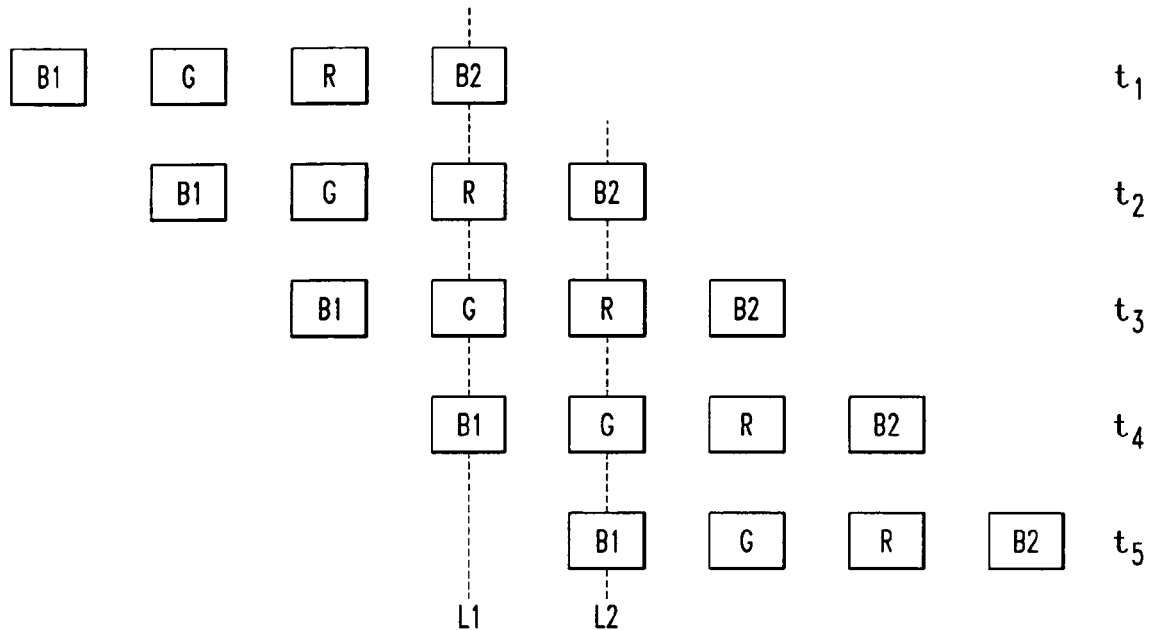
FIG. 10 is a diagrammatic representation of addition of color components at selected locations, including the more than one light emitter of a given color.

As seen in FIG. 10, at time T1, the blue emitter 2106 illuminates a pixel location L1. At time T2, the blue emitter 2106 illuminates a pixel location L2 and the red emitter 2108 illuminates the pixel location L1. At time T–3, the red emitter 2108 illuminates the pixel location L2 and the green emitter 2110 illuminates the location L1. At time T4, the green emitter 2110 illuminates the pixel location L2 and the second blue emitter 2104 illuminates the pixel location L1.

As summarized in the lower portion of FIG. 10, pixel L1 is produced by the sum of the light outputs from the emitters 2104, 2108, 2110, 2106, at times T1, T2, T3, T4, respectively. Because the pixel L1 includes outputs from two different blue emitters 2104, 2106, the blue component of pixel L1 is the sum of the two outputs. This can effectively reduce the power output from individual emitters 2104, 2106, thereby allowing the system to incorporate a plurality of lower power and possibly less expensive or more easily available light emitters. Additionally, because the two light sources are not likely to have noise patterns that add linearly and coherently the power to noise ratio may be higher than that of a single, higher power light source or the system may have less noticeable interference or speckle effects.

Though the exemplary embodiment previously described incorporates two blue light sources 2104, 2106, together with a green light source 2108 and a red light source 2110, other combinations of light sources may be utilized. Additionally, although the light sources described herein have been visible light sources, some applications may incorporate nonvisible wavelengths. For example, in one approach, the green and red light emitters can provide green and red light directly in the image field, while an infrared or ultraviolet light source replaces, or supplements the blue light emitter, and activates a blue-emissive phosphor in the image field to produce the blue components of the pixels. Other combinations of phosphor-emitted or frequency doubled light at blue, green or other wavelengths, with visible light may also be used for certain configurations. Additionally, such nonvisible light sources may provide synchronous nonvisible components in the image field that are not intended for viewing by the user. Instead, photodetectors aligned to the image field detect the infrared components to identify beam position, provide synchronizing information, or provide other information.

One characteristic of the resonant scanner is that the mirror exhibits a sinusoidal variation in angular velocity, as is described in the '979 patent. Moreover, in most approaches the beam is within the usable field of view for approximately 90% of the mirror cycle. Consequently, the angular beam velocity at the edge of the screen is significantly slower than that at screen center. However, unless the data are pre-processed or interpolated "on the fly," it is typically desirable to place the pels for each of the five sub-beams (per color) the appropriate locations to create uniform size dots on the display and also to maintain alignment among the five beams. Small variations in beam placement can produce jagged edges in straight lines that are readily visible to the user. In color systems, small differences in timing among the three separate drive blocks can cause misconvergence of the RGB elements, resulting in visible differences in coloration throughout an otherwise uniform color field, and halation at color change boundaries. However, in many applications, the viewer will be only modestly sensitive to the geometric distortions caused by non-uniform pel size, so long as the errors are smoothly distributed.

A separate clock system controls timing of the incoming video and is typically a constant frequency signal from a crystal clock embedded in the video source. In one approach the system clock may be varied to accommodate variations in the physical system, such as resonant frequency variations in the scanner. In this alternate approach, the control system determines deviations between the horizontal sync signal timing and the scanner timing. Rather than, or in conjunction with, controlling the frequency of the scanner, the control system provides an error signal that shifts the horizontal sync frequency.

Figure 11:
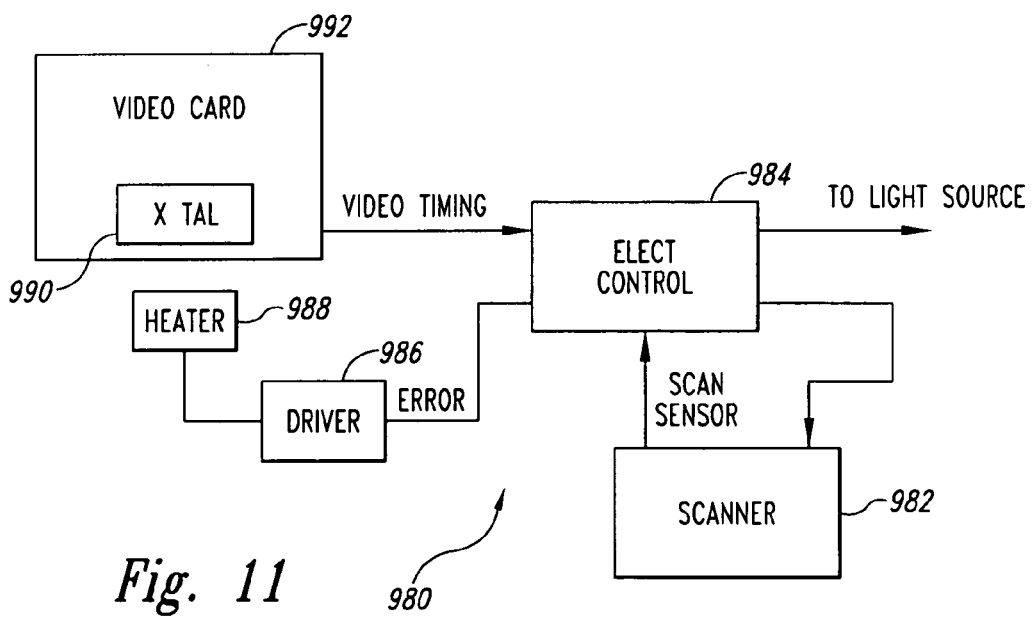
FIG. 11 is a diagrammatic view of a video timing control structure with a scanning sensor as an input to an electronic control circuit.

One such approach is presented in FIG. 11, where the position signal from a scanner 982 is input to a control circuit 984. One skilled in the art will recognize that many components, such as the light sources, image source, and optics have been omitted from FIG. 11 for clarity. Responsive to the position signal and the sync component of an image signal, control circuit 984 generates an error signal that is coupled to a driver circuit 986. The driver circuit 986 powers a local resistive heater 988 that heats a timing control crystal 990 on a video card 992.

As is common, the timing control crystal 990 is a quartz crystal in a resonant circuit that has a resonant frequency dependent upon the mechanical properties of the crystal. Because the resistive heater 988 changes the mechanical properties of the crystal, the resonant frequency of the circuit and thus the timing of the video card 992 changes. The timing of the horizontal sync depends upon the timing of the video card 992, and thus varies responsive to the heat. Consequently, the control system 980 can control the horizontal sync timing by selectively controlling the electrical signal to the resistive heater 990, responsive to the determined deviation between the horizontal sync and the scanner timing.

In an alternative approach to controlling the frequency of the input signal, the error signal can drive a voltage controlled oscillator (VCO) or digital control circuit in a video driver board. This is typically most convenient where the designer has ready access to control circuitry in a video driver board or to other frequency control circuitry in a system.

Returning to the timing control of the video blocks discussed above, the control circuitry produces the dot clock synchronized to the fixed horizontal clock, as will be described below. At the SXGA dot clock of 108 MHz (9 nsec period) differences in timing of as little as 1 nsec among the three drive blocks might visibly degrade image quality.

One approach to producing the dot clock, described in the '979 patent, employs an over-sampled digital clock which approximates the sinusoidal variation in scanner beam velocity. While this approach can provide adequate performance for many applications, the currently preferred embodiment generates a more flexible timing control signal that can improve performance in many applications.

Figure 12:
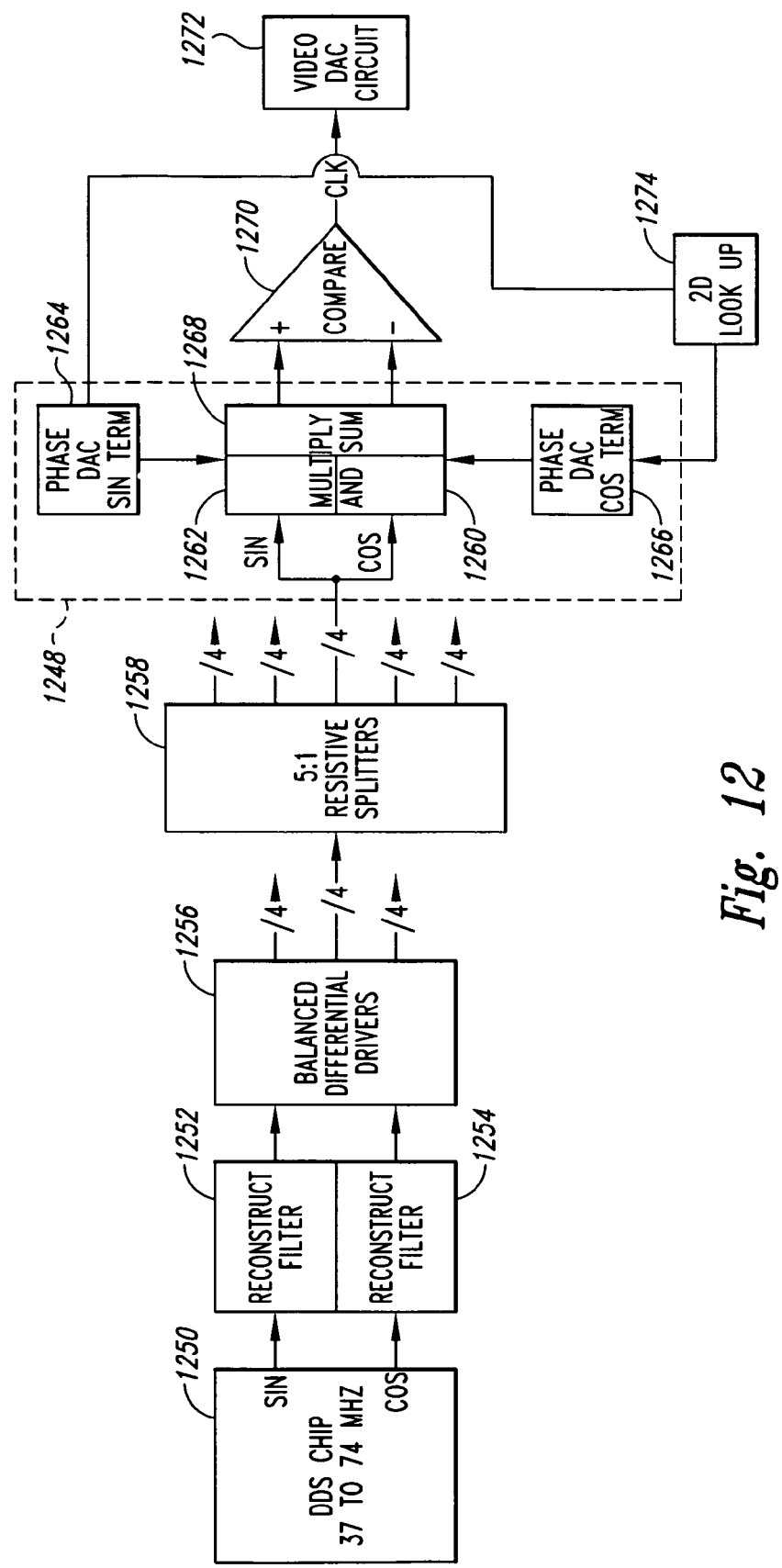
FIG. 12 is a block diagram of a video signal circuit for driving five video D/A converters using phase quadrature.

As presented in FIG. 12, the control system generates a clock that tracks the sinusoidal variation in scanner beam velocity using a Direct Digital Synthesis (DDS) chip. DDS's are commercially available devices and one such DDS utilizes a clock multiplier to create an internal time base of 300 MHz. One such commercially available DDS is the Analog Devices AD9854.

As will be described herein, the DDS output can be combined with analog reconstruction of a clock waveform to generate precise clocks of 120 MHz. As will also be described, the commercially available DDS provides frequency ramping capability to approximate the sinusoidal frequency variation with a series of linear ramps.

An additional feature of this embodiment is individually adjustable timing for each of the light sources or their corresponding external modulators. The adjustable timing allows electronic control of the relative horizontal pixel positions to compensate for differences in beam alignment caused by the optical delivery system. Additionally, the electronic timing adjustment can compensate for variability in propagation of the laser beam through the modulator. For example, a slight error in beam position can change the acoustic path length from the AOM piezo-electric element to the beam center. A change of only 0.001" can cause a time delay on the order of 20 nsec. This time delay can produce a misplaced pixel location, without electronic phase compensation.

The DDS can produce a clock that very closely tracks the beam velocity of the resonant scanner and does not necessarily require high frequency elements to supplement the clock internal to the DDS chip or massive computational burdens. For a maximum clock frequency equal to the screen-center dot rate of about 60 to 100 MHz, the embodiment of FIG. 12 may process a single data point for each output pel.

Other components in the system are also generally commercially available. For example, TTL compatible D/A converters are available in this performance range. For example, the Analog Devices ADV7127 provides 10 bits of precision at output rates of up to 240 MHz.

Sinusoidal Clock Generation View DDS

Turning to a description of the individual components in the control system, as shown in FIG. 12, a separate DDS clock circuit 1250 drives each AOM. While the DDS chip 1250 typically requires only a modest amount of support circuitry (primarily an analog filter to reconstruct the sampled clock waveform), power and space concerns may make this approach undesirable for some applications. Additionally, the simplicity of timing and synchronization involved in reducing the number of DDS chips often makes a lower number of DDS chips desirable. Accordingly, the system described with respect to FIG. 12 utilizes a single DDS that provides the clock signal for every AOM in the display.

Single DDS For All Beams

In an alternative approach, a single DDS can control timing of a plurality of beams. One observation is that, where the system has a single mirror, the mirror has only one velocity. Thus, a single DDS can provide clocks for every beam in the system, even where nearest neighbor sub-beams of a single color are displaced by several pels, due to optical alignment with the mirror. Viewed another way, a one pel wide vertical line created by these beams contains pels that are produced at different mirror angles (and therefore different clock speeds); but, each of the beams produces a pel of the same physical extent at the display because its clock period is exactly proportional to its instantaneous mirror velocity.

While it may impose system constraints in certain cases, using a single DDS for all beams can eliminate many of the problems that may arise for synchronizing multiple DDS chips. Additionally, this approach limits power consumption of the clock generating circuitry.

Alternatively, it may be desirable in some applications to generate a modified pel stream at constant frequency. Oversampling the pel stream and interpolating between the sub-pels which end one dot and begin the next can simulate exact placement of the dot boundary. While this system can produce a slight blurring of sharp edges and may be relatively demanding in terms of sampling clock frequency, this approach can be less costly in some implementations.

Using a fixed clock with over-sampled pels can produce a simple clock scheme and allow the entire output system to run synchronously, thereby reducing difficulties with clock noise. The over-sampled pel stream provides an opportunity to perform certain display enhancements such as pre-emphasis of the video to make up for limitations in AOM frequency response.

One approach uses a set of FPGAs in the drive block that generate the required data and such systems have been built. The system uses commercially available high speed video DACs that provide multiple input data paths so that clock rates at the DAC can be reasonable. For instance, the Analog Devices ADV7162 has four input channels and a 4:1 clock multiplier. This device supports an output rate of only 220 MHz, to produce about a 3:1 over-sampling of a 74 MHz dot clock. As device frequency improves, a higher over sample rate may be implemented.

Another more costly candidate for pel over-sampling is the Analog Devices ADV7129, a triple DAC with 8:1 data multiplexing that can achieve output speeds of about 360 MHz, thereby supporting almost a 100 MHz screen-center dot rate. The converter resolution is 8 bits and on-board Gamma correction tables expand the converter range to effectively 10 bits at the output. Alternatively, single input path ECL D/A converters which operate at speeds of up to 1 GHz may be appropriate for applications that can tolerate relatively high power consumption. In some applications, these converters may require ECL translators for interfaces to other circuits and a single data stream inputs at rates above 150 MHz.

Sync Phase Measurement

Figure 13:
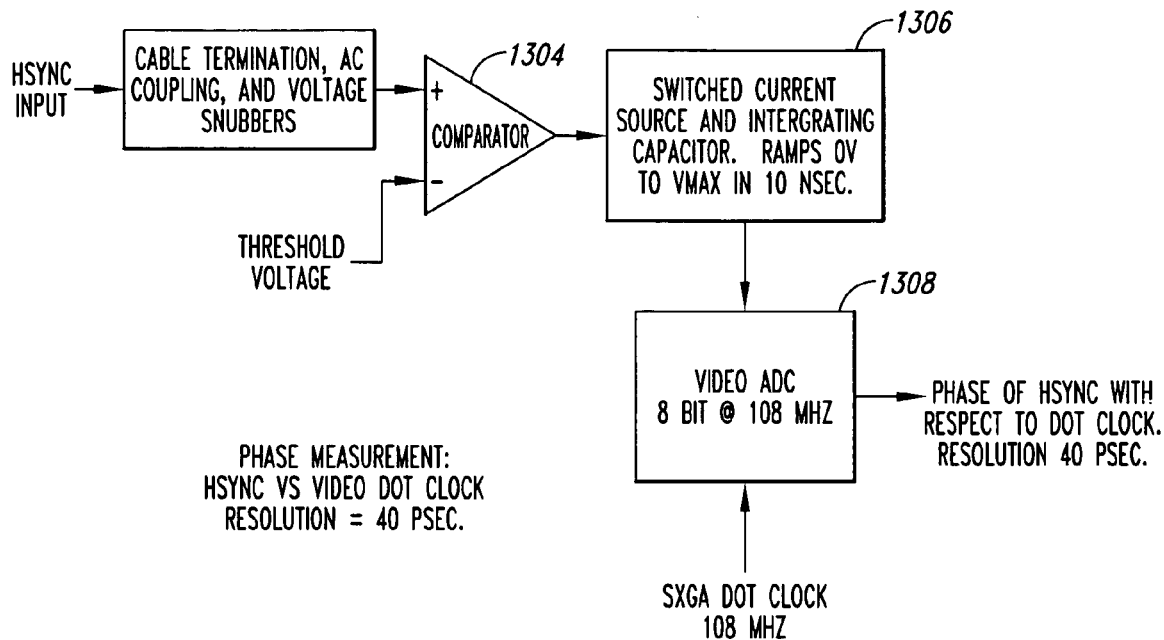
FIG. 13 is a block diagram of a circuit that compares a horizontal sync timing with a pixel ("pel") acquisition clock.

Before describing the circuitry for producing the clock signal, it is useful to describe an approach to measuring the phase of the sync signal. FIG. 13 shows an approach that yields adequate resolution without an ultra high speed clock or complex delay line. The circuit includes an analog ramp generator (current source driving a capacitor) and a video A/D to characterize the incoming signal. The same method can be applied to either video HSYNC or the MRS sync signal.

FIG. 13 shows the circuit setup. The HSYNC signal is delivered to a high speed comparator 1304 so that it can be subjected to an accurate threshold. The output of the comparator 1304 switches a current source 1306 that creates a ramp signal by driving current onto a capacitor. For an SXGA 108 MHz dot clock, a ramp time constant of about 10 nsec (zero to full scale) is appropriate.

On each rising edge of the dot clock, an A/D converter 1308 takes a snapshot of the HSYNC initiated ramp. An amplitude resolution of 1 part in 256 provides an effective time resolution of approximately 40 psec at the A/D converter 1308. However, for many typical commercially available devices, the actual accuracy is somewhat less, on the order of about 100 psec. This may be suitable for some applications. The same basic structure applies to both the HSYNC and MRS sync, although the actual circuit implementation may differ somewhat.

Alternative methods for measuring syncs, include a 2 GHz digital system yielding 500 psec or a variable or tapped delay line (possibly internal to the FPGA) for phase measurements. These methods typically have quantization error in the 1 nsec range.

Phase Adjustment for Individual DACs

One consideration in a single DDS master display clock approach of FIG. 12 is individually re-phasing the 15 beams in a system to provide beam alignment. Since pels are of variable duration across a horizontal sweep, a beam-to-beam time difference of 8 nsec results in a ¼ pel error at the screen edge, but a ½ pel error at screen center. Hence, if the adjusting the alignment of a particular beam by ½ pel, a fixed time adjustment will not provide appropriate positioning for all pixels.

In one approach, such as that of the '979 patent, time adjustments of more than one pel can be accomplished by a counting method. However, for beam adjustment to $\frac{1}{8}^{th}$ pel to make a high quality image, the corresponding frequency may be higher than desired. One approach to correcting the position more precisely is to implement a tapped delay line or ramp-generator based delay chip to create the necessary small adjustments. Since both of these methods create time delays instead of phase delays, such systems typically implement multiple adjustments during the course of a sweep to maintain a constant phase relationship (for instance, ⅜ pel later than the master clock).

To make better use of the DDS outputs, the preferred control circuit takes advantage of a discriminator that is included in the DDS chip to produce a digital DDS clock by slicing a filter-reconstructed analog signal produced by the output DAC in the DDS, as will be described below. The DDS produces both sine (0 degree phase) and cosine (90 degree phase) outputs. The zero crossings of the sine-clock provide 0 and 180 degree phase angles; the zero crossings of the cosine-clock provide 90 and 270 degree phase angles. This directly provides four phase angles and that drive a four element comparator to produce outputs with delays matched to 300 psec. The comparator outputs form the basis of a clock distribution system.

I-Q Modulation for Phase Rotation

As shown in FIG. 12, clock production begins by passing the sine and cosine outputs of the DDS 1250 through independent reconstruction filters 1252, 1254 to form precision analog sinusoids. Balanced differential drivers 1256 prepare these signals for transmission by cables to the other locations in the system. Differential signals arriving at each of the other locations are matched to the local trace impedances and split 5:1 with a simple resistor network 1258 to produce a sine/cosine signal pair dedicated to each video DAC. Alternatively, in more cost and/or space tolerant applications, magnetic signal splitters may split the signal while conserving power.

The discriminator 1248 includes a pair of four quadrant analog multipliers 1260, 1262 that form the I-Q Modulator, with one multiplier 1262 for sine and one multiplier 1260 for cosine. Together, the multipliers 1260, 1262 can smoothly rotate the phase of the incoming clock(s) by any angle from zero to 360 degrees, as shown by the following equations:

Identity: $\sin(X+Y)=\sin(X)\cos(Y)+\cos(X)\sin(Y)$

If X equals the base frequency ($\omega t$) and Y equals the phase angle ($\phi$) then $\sin(\omega t+\phi)=\cos(\phi)\sin(\omega t)+\sin(\phi)\cos(\omega t)$ or $\sin(\omega t+\omega)=A\sin(\omega t)+B\cos(\omega t)$.

A and B are voltages supplied by two low performance DACs 1264, 1266. One such multiplier is a Gilbert cell multiplier such as an Analog Devices AD834. The Gilbert cell input is differential, to more adequately respond to signals transmitted from a remote location with a possible ground variation. The differential outputs of two Gilbert cell multipliers are directly summed (current mode outputs) in a conventional summing circuit 1268 to drive a high speed comparator 1270. The comparator 1270 detects the zero crossings of the re-phased master clock and supplies a digital clock to the DAC 1272.

Where the differential signal transmission is sinusoidal rather than square edged, the system broadcasts relatively little RF noise. Moreover, differential signal reception can remove many problems associated with ground bounce between cards.

The 8 bit phase DAC 1272 can provide phase resolution of better than one degree. Where the system uses a common clock with a corrected clock, the system can be relatively tolerant of fixed delays in the signal distribution system Consequently, many variations related to temperature, voltage, and aging may be reduced by individually re-phasing each beam.

As discussed above, a difference in fixed delays between two channels typically causes a larger beam offset at screen center than at the screen edge. For instance, a 2 nsec clock delay difference would cause a ⅛th pel shift at screen center, but the same delay amounts to only ¹⁄₁₆th pel at the screen edge. So, alignment is not constant throughout the sweep. This control system compensates, by modifying the phase DACs 1264, 1266 during the sweep. Since the phase DACs 1264, 1266 are not in the direct clock path, changing the phase can produce a smooth rotation of phase to maintain the desired alignment with no disturbance to the clocks.

In one approach, varying the phase DACs 1264, 1266 on each sweep can be extended to provide full multi-position beam alignment for the display. In this approach, shown in FIG. 12, a 2D lookup table 1274 provides the parameters for beam phasing. The look up table 1274 can thus provide independent beam alignment for as many display sections as required. This can be used to compensate for problems in the optical and mechanical system.

In an alternative approach, matched high-speed clock repeaters distribute all four clock phases to each DAC location. At each DAC location, a commercially available FET-based multiplexer with an insignificant delay selects the phase of interest.

An extension of this technique to 8 phases by comparing the sine and cosine signals to provide the other four phases. For instance, sine=cosine at 45 degrees phase and negated-sine=cosine at 135 degrees. With careful attention to time skews the system can thus create the 8 digital clocks. Chip-to-chip skew among the clock repeaters may also be a consideration on pixel placement error determinations.

Sweep to Sweep DDS Timing Variations

Figure 14:
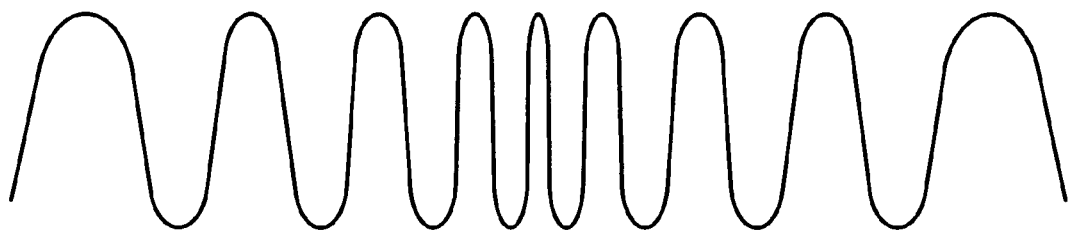
FIG. 14 is a simplified signal timing diagram of a driving signal including an increasing frequency chirp and a decreasing frequency chirp.

The varying frequency profile which matches the mirror velocity is produced by a series of FM ramps or chirps, where each chirp forms part of a piecewise linear approximation to the mirror velocity profile. A simplistic representation of a chirp is presented in FIG. 14. One skilled in the art will recognize that, for purposes of clarity of explanation, the chirp of FIG. 14 is merely representative of the concept and is not the actual waveform. The actual waveform would include many more cycles with a less pronounced frequency variation.

In essence, the DDS performs the frequency chirp based upon a starting frequency and a prescribed slope and duration, each of which typically comes from a command set. When a new command is applied to the DDS, the control command gets synchronized to the internal SYSCLK inside the DDS chip 1250 of FIG. 12. Internally, the DDS setup produces a SYSCLK near the maximum frequency of 300 MHz, resulting in a clock period of 3.3 nsec. For an 'external update' the specified frequency profile typically comes from a stored data set that is calculated or determined empirically and stored in a local memory.

In this approach to entering new commands into the DDS 1250, the command execution may be shifted by one clock period. For instance, if the start of a new FM chirp is late by as much as 3.3 nsec, then all frequencies in the chirp are somewhat less than desired. The resulting clock edge error increases with elapsed time. Models of this process indicate that the maximum error is a function of the total frequency deviation of the series of chirps. For the scanning beam display this frequency ratio is about 2:1 and may produce errors on the order of 2 nsec (⅛$^{th}$ pel) at screen center.

Figure 15:
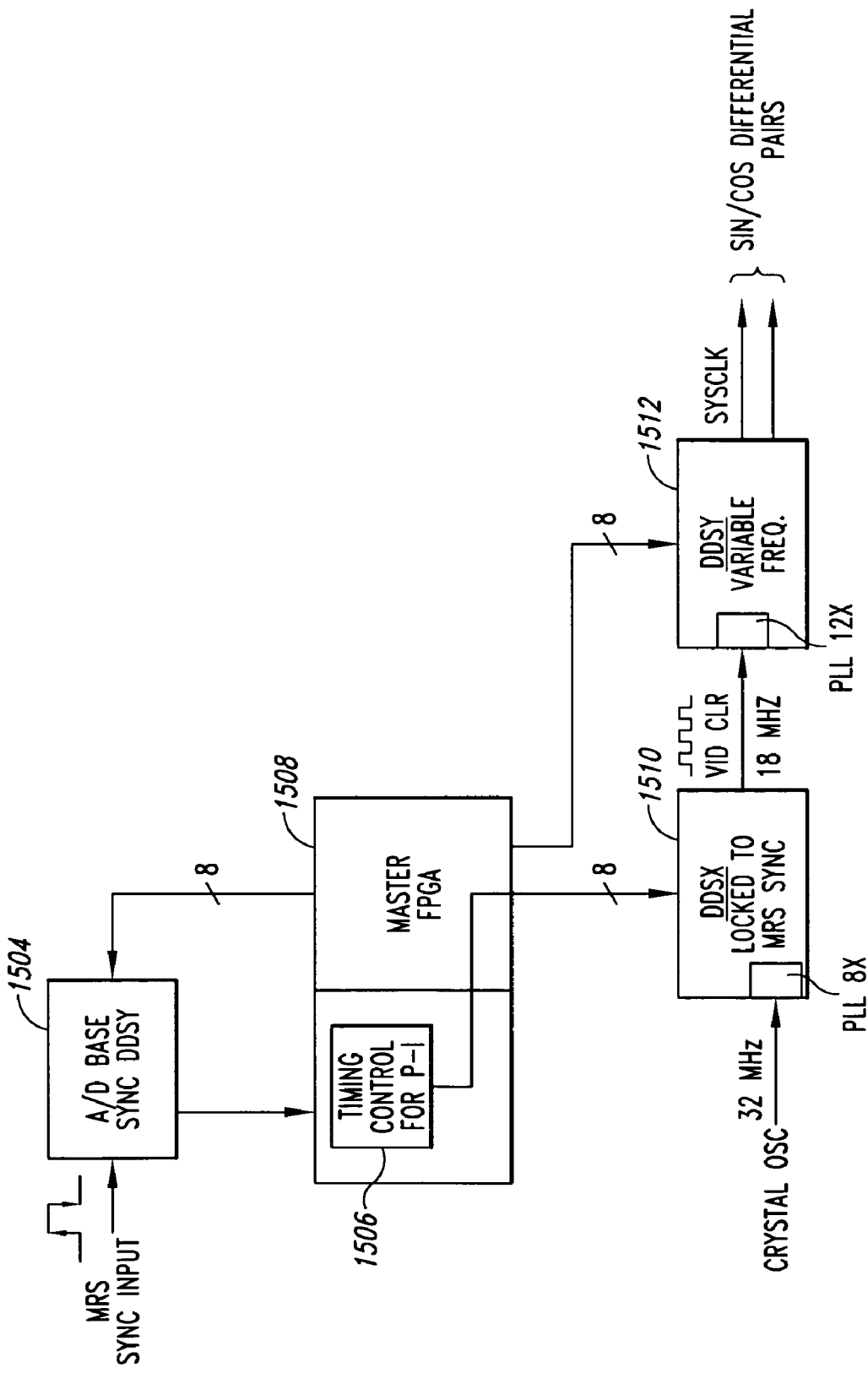
FIG. 15 is a block diagram of a circuit for producing a system clock from a scanning sense signal and a crystal oscillator.

In one approach to controlling the timing precisely, the circuit of FIG. 15 locks the SYSCLK to the mirror frequency MRS SYNC, such that an exactly integral number of DDS internal clock cycles occur for each mirror sweep. In this approach, an A/D sync detector 1504 receives the mirror sync signal MRS SYNC from the mirror position detector 1504 after conditioning and threshold detection. A timing control circuit 1506 within an FPGA 1508 analyzes the mirror sync signal's timing and provides control data to a first DDS 1510 (referred to herein as DDSX) operates near the minimum pel frequency of 18-34 MHz with a frequency variation sufficient to accommodate variations in the mirror frequency. The DDSX output feeds a second DDS 1512 referred to as DDSY. The second DDSY 1512 multiplies the input frequency by about 8:1 or 12:1 to form an internal SYSCLK of nearly 300 MHz. This internal clock SYSCLK exhibits an exactly integral relationship with the mirror cycle. FM chirp commands tied to specific counts of SYSCLK will therefore execute in the same manner on successive sweeps, producing a programmable clock period with adequate sweep-to-sweep stability.

To lock to the mirror frequency, the A/D converter 1504 receives a sync signal from position detectors in the scanner. When the A/D converter 1504 input passes a prescribed threshold, the output shifts. The sync timing is then determined from a simple interpolation approach with appropriate filtering to determine the sync timing to which the frequency can be locked.

In an alternative approach, additionally processing can reduce noise and jitter problems. In this approach, a digital signal processing circuit performs a digital Fourier transform, such as a common FFT or other digital conversion to produce a transformed representation of the position detector signal. Using conventional digital signal processing techniques, such as low pass spectral filtering, the digital signal processing circuit can reduce noise or remove artifacts.

Video A/D Converter Clocks

Overview

Figure 16:
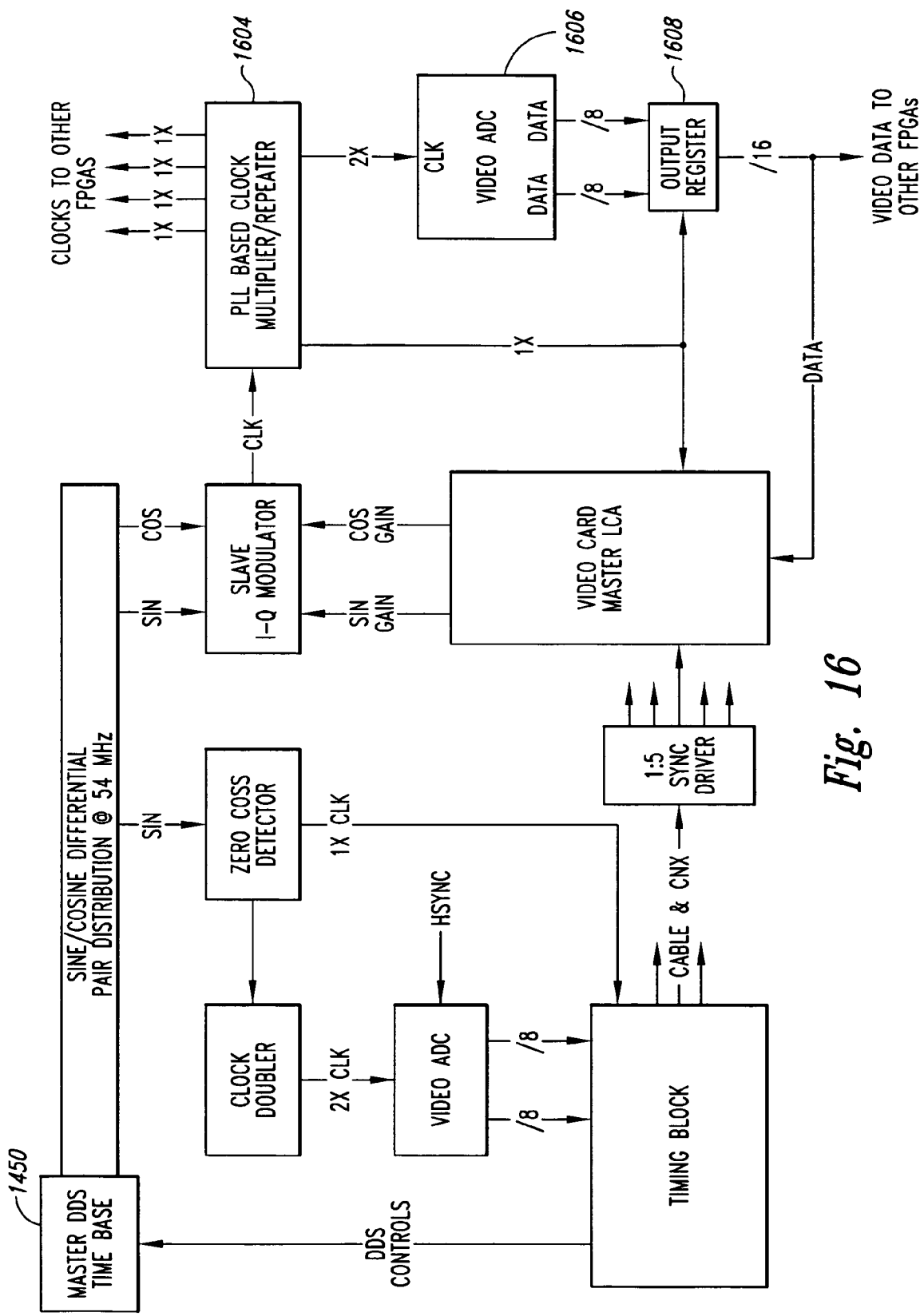
FIG. 16 is a block diagram of a video clock distribution portion of a control circuit.

In one approach, the video A/D clocking shown in FIG. 16 is essentially the same as that used for the display DACs. In the Timing block, a video A/D converter 1606 performs precision phase detection of the incoming HSYNC as described above to yield timing precision in the 100 psec range. The corresponding phase information drives the acquisition DDS chip to reproduce a signal matching the dot clock frequency of the transmitting video source. The phase angle of the master clock with respect to the source dot clock is initially unknown (depending on how well the video source aligns HSYNC to its own dot clock) but the phase angle is typically constant. As described below, the DDS-sine and DDS-cosine waveforms are filter reconstructed and differentially driven to three Drive blocks.

On each Drive block, an I-Q Modulator and comparator construct a precisely phased digital clock, as described above with reference to FIG. 12. During display setup, the operator can independently re-phase each of the A/D converters to obtain the desired image quality. Unlike a strictly one-clock system, this circuit can compensate each video channel independently for small differences in cable lengths, delays through the input amplifiers, and aperture delay differences among the A/D converters.

2× A/D Clock Multiplier

As shown in the overall clock distribution system of FIG. 16, a 2× clock multiplier 1604 is coupled immediately in front of an A/D converter 1606. The 2× multiplier 1604 permits SXGA dot clock generation at 54 MHz instead of 108 MHz to maintain separation between the upper frequency limit of the DDS (120 MHz) and well away from the corner of the reconstruction filter, thereby resulting in a better clock waveform. Also, the lower frequency helps in maintaining communication between the master clock FPGA and the Drive blocks for frame synchronization, as described below.

Figure 17:
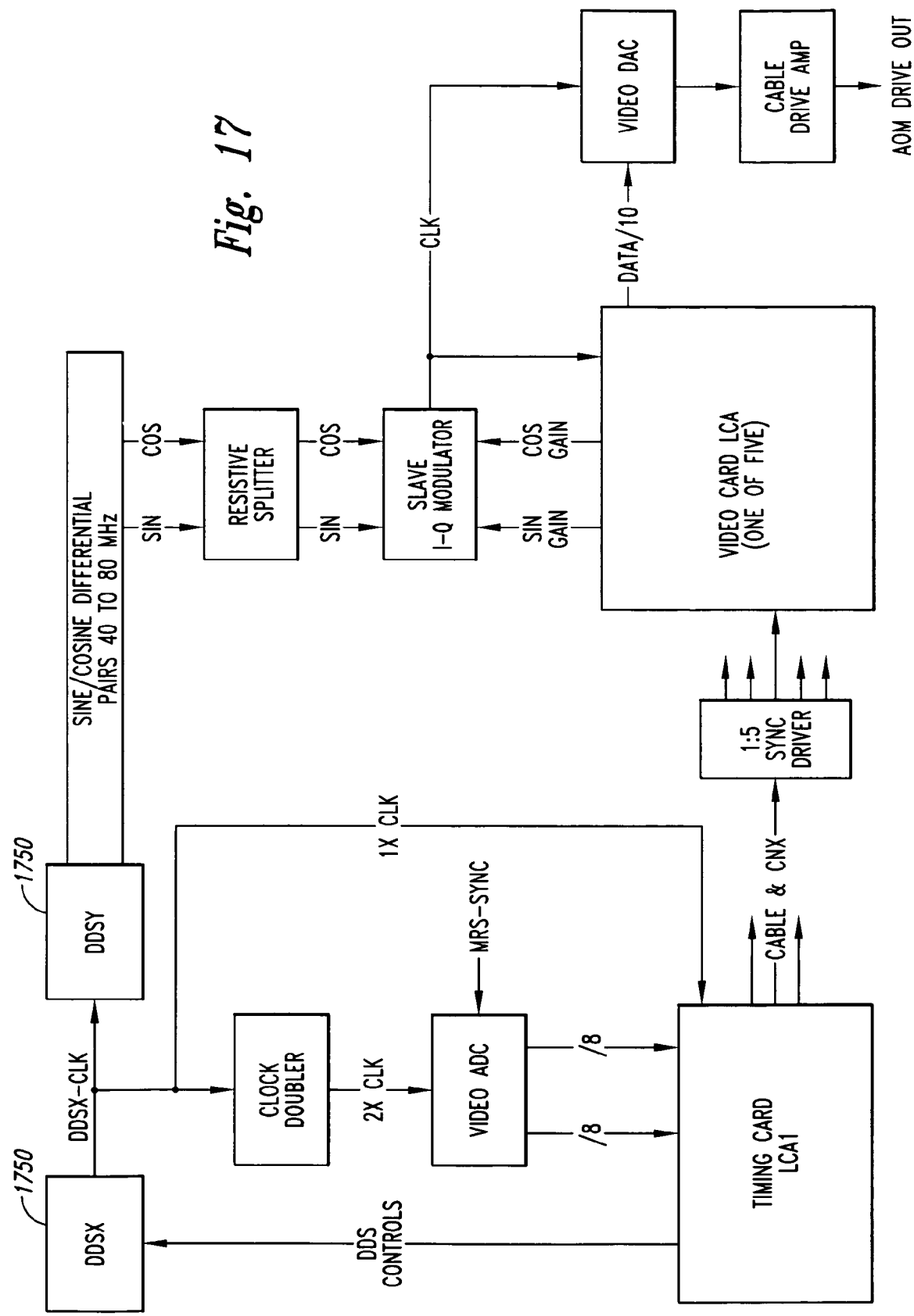
FIG. 17 is a block diagram of a scanning clock distribution portion of a control circuit.

A similar clock distribution circuit distributes the scanner clock and synchronization signals, as shown in FIG. 17. However, in the circuit of FIG. 17, the 2× multiplier is omitted.

Note that the clock multiplier 1604 reduces the effective phase precision of the I-Q Modulator by 2:1 while maintaining a precision of better than 2 degrees of phase at 54 MHz. This equates to 1% of a dot clock.

An external register 1608 captures the ADC output and provides drive capability to support fan-out to five FPGAs (not shown in FIG. 16). The register 1608 and FPGAs are all clocked with PLL-buffered copies of the 1× (54 MHz) clock. The master FPGA 1610 applies RESET to the ADC 1606 for one full 1× clock tick (during frame sync) in order to insure that the ADC internal clock divider has the correct phase.

Sampling the Video Porch Edge

To maintain synchronization of the A/D clock phase, the control system utilizes a feature that is directly in the incoming video, i.e. one of the porch edges (transition from blanking level to active video or reference black). Phase locking to a porch edge provides a servo-mechanism to compensate for slow variations in timing caused by temperature, voltage, and component aging. Where the source video format provides porch edges during the vertical retrace period, the system can rotate the phase of the A/D clock (during vertical retrace) from 'sampling phase' to 'porch edge phase' to fine tune phase matching. During initial setup of the display, the relationship between these two phases is determined. This measurement is then compared to the apparent phase of the porch edges during each vertical retrace interval by rotating to 'porch edge' phase and taking A/D readings of the edge. If the edge is not centered or otherwise appropriately positioned in the appropriate A/D sample interval, a small phase adjustment is performed to achieve centering. This adjustment is retained during 'sampling phase' referenced next frame, thereby locking the sample clock to the edge content of the incoming video.

While the exemplary embodiment may implement this feature in some applications, it will generally not be implemented if the video source and clock generation method are both sufficiently stable.

Inter-Drive Block Transmission of Syncs

A centralized DDS for each type of clock allows operation of the system with detailed phase information about the sync signals only at the Timing block. As described herein, the system uses phase information contained in the syncs to adjust the DDS to maintain lock between the A/D dot clock and the video source, or between the display dot clock and the scanner.

The system then distributes synchronization information from the Timing block to the Drive blocks. This allows control of timing of the sampling of each line of video at each Drive block. Many conventional systems control timing by distributing HSYNC to the A/D controllers. However, such signal distribution can prove problematic because it relies on the A/D clocks to identify a specific pel and yet the three A/D controllers may have slightly different clock phases to maximize digitizing performance. These differences in phase might cause communication of the sync signal to be corrupted, or even mis-assigned to the wrong pel period.

As background, it is useful to note that the Drive blocks do not necessarily require a synchronizing signal for each line of video. In this embodiment, all Drive blocks are locked to the Timing block DDS, and each Drive block has its own video frame counters. Once the cards achieve frame synchronization, the frame counters can maintain the synchronization.

The system establishes synchronization during the vertical retrace interval and a single synchronizing event during vertical retrace can be enough to set all frame counters to the exact same count. Frame alignment is held throughout the coming frame and then redundantly established once again during vertical retrace. Hence, the traditional ideas of vertical sync and horizontal sync can be replaced by a single 'frame sync' signal.

During the vertical retrace interval, there is no video data to digitize. A first order solution to insure good communication of the sync signal from the Timing block to each of the Drive blocks is to set each Drive block A/D clock to zero degrees phase angle during vertical retrace. The Timing block FPGA (DLL locked to the DDS zero degree output) generates a sync signal. The timing block then produces three copies of the sync output signal (one 54 MHz clock tick in duration), one for each of the drive blocks. On each receiving drive block, a high speed clock buffer provides distribution to the five FPGAs.

Returning to the link from the Timing block to the Driver block, the sum of source FPGA clock-to-output delay plus the driver delays will provide adequate Hold time at the receiving FPGA. The 19 nsec period of the 54 MHz clock provides adequate setup time (about 1.2 nsec). Even though the synchronizing signal is two dot clocks long, the recipients agree to assign it to a specific dot clock within the double interval, so complete synchronization is achieved. This can be selected as part of a system protocol or negotiated between the blocks upon initialization of the system.

Automatic Communication Phase Compensation

In some applications, it may be desirable to extend the 'communication phase' among the drive blocks. For example, at higher clock speeds, it might become difficult to mathematically establish a safe window of communication among the blocks (due to differences in clock construction, FPGA DLL circuits, and sync distribution). In one approach, the Timing block provides a long preamble to the sync signal that consists of an image of the source clock (released synchronously by using a 2× clock internal to the sending FPGA). Each receiving FPGA demodulates the preamble using its local clock, which is set to 'communication phase'. If this phase is a little early, all received bits will be ZEROs; if a little late, all received bits will be ONEs. Varying the receive clock phase slightly during preamble reception will cause both results to occur, allowing the drive card to identify a precise phase relative to the sender (including all time delays in the system). Rotation of 180 degrees from this phase permits secure communication of the single sync pulse which follows the preamble (two clock ticks long=four dot periods, with the sync event assigned to the leading dot period).

While the system of FIG. 16 does not typically require automatic compensation for 'communication phase,' the technique may provide secure inter-card synchronization at high clock rates; e.g., in excess of 100 MHz.

Display Sync Transmission

The technique for display sync transmission, shown in FIG. 17, is similar to that for video HSYNC of FIG. 16. A special difficulty of transmitting display sync is that the Timing block FPGA which sources this display sync uses fixed frequency DDSX output as its clock source. But the receiving FPGAs on the Video cards use the variable frequency DDSY output. These two clocks have a mathematically exact relationship, but it is difficult to predict their exact relative phase due to delays in DDS signal generation and filtering. Furthermore, the phase relationship changes whenever the DDSY frequency profile is changed.

To resolve this situation, each Video card FPGA has a simple phase detector for the incoming display sync signal. This phase detector (described below with reference to FIG. 24) permits a programmer to optimize the display IQ modulators on the video card for secure sync reception.

During the display vertical retrace time, all of the receiving IQ modulators are set to the 'communications phase' setting. The synchronizing signal is a single clock width event sent by the FPGA in the Timing block. This sets the display frame counters in all 15 receiving FPGAs to the identical count. There is no need for synchronization information at the line rate, since the Timing block measures the incoming horizontal MRS sync and adjusts the master DDS chip to compensate for line-to-line differences in the sync arrival time.

To maintain frame lock between the video source and the scanner, it is occasionally useful to adjust the frame length of the scanner. This is accomplished during the early portion of vertical retrace by adding or subtracting a single horizontal cycle (80 usec). If the Drive block FPGAs are not made aware of this adjustment, according to their frame counters, the ensuing Frame Sync might arrive one line early or late. Hence, the system frame synchronizes on every scanner frame to insure all the drive cards are properly aligned.

Drive Block FPGA

Overview

The drive card FPGA is a commercially available device such as a Xilinx Virtex series device with 100K gates in a 256 pin BGA package that is chosen to ease layout considerations. This FPGA is has 10 BlockRAMs, where each BlockRAM is a 4 Kbit memory. The BlockRAMs can be used as buffer storage or for table lookups. Other circuits or devices, such as application specific integrated circuits, may perform similar functions in alternative embodiments.

Drive Block Master FPGA

Figure 18:
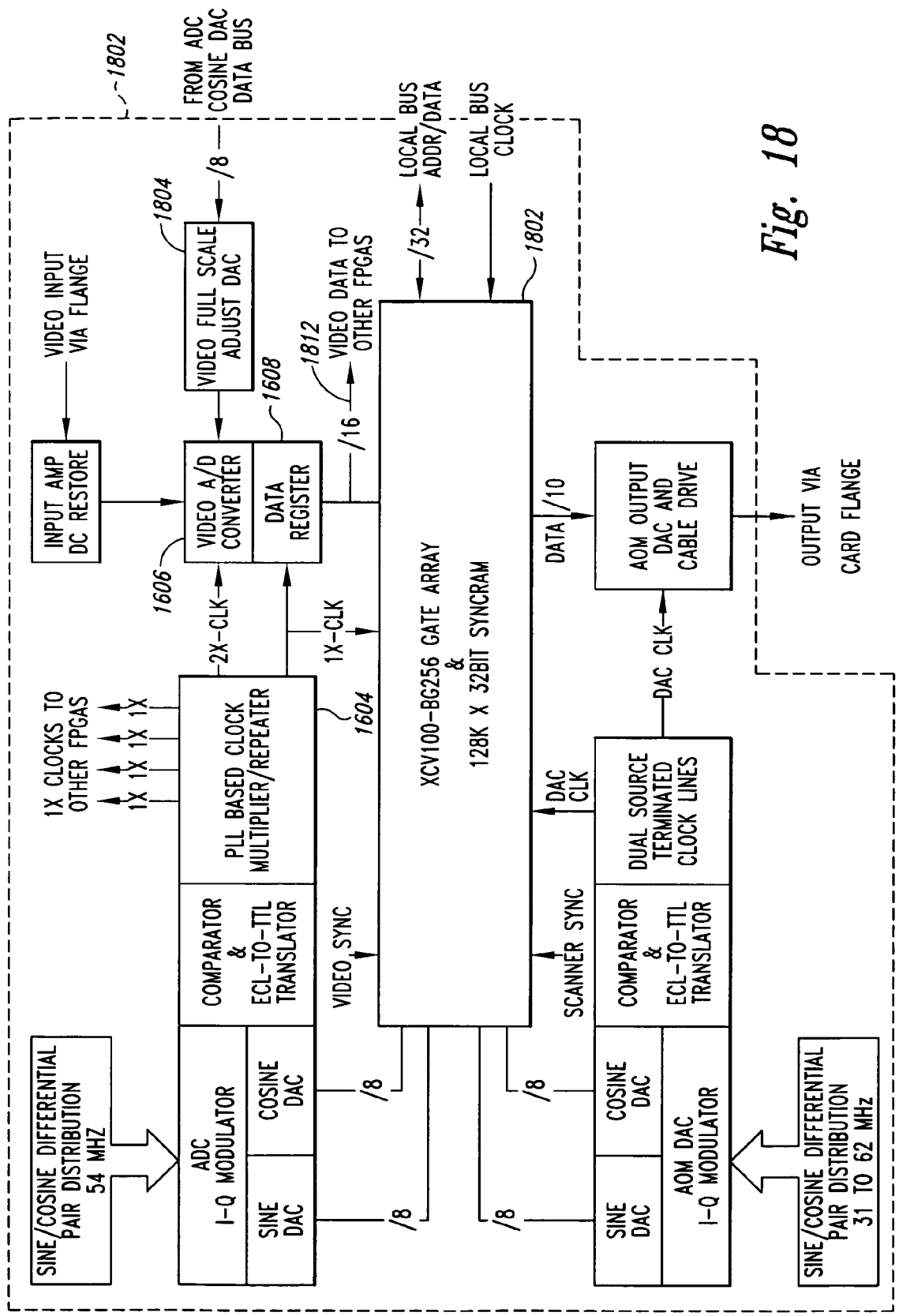
FIG. 18 is a block diagram of a master FPGA.

One of the five FPGAs on the Drive Block is designated as the Master device because it controls an A/D converter 1606. FIG. 18 shows the setup for this FPGA 1802. It is useful to note that a video full-scale adjustment DAC 1804 shares the ADC Cosine DAC data bus. This consolidation of wires can help to make the packing more compact and less complex. Additionally, the ADC 1606 produces two 8 bit output streams at one half the sample rate. The Timing block produces its sine/cosine differential pairs for the ADC at the lower (1×) rate. Just before the ADC, the 2× clock multiplier 1604 produces the full sampling frequency. This keeps the 1× clock in a range where the DDS on the Timing block can produce the waveform directly, without resorting to an 'image frequency' of the DDS output. The clock doubler uses an internal PLL to maintain alignment of the 1× and 2× clocks. However, these clocks are not necessarily locked to the input signal as would typically be the case for a PLL-based zero delay clock buffer. This imposes a time delay of a few nsec in the clock buffer/multiplier.

The 1× sample clock clocks the FPGAs on the Drive block for receiving the video data. A PLL based repeater in the multiplier 1604 copies the 1× sample clock for a total time delay of less than 1 nsec. Due to the low output drive of the A/D converter 1606, a data register 1608 is placed directly adjacent to the converter outputs and clocked by a copy of the 1× clock. This delays the video data by one tick while providing adequate drive for the 16 bit data bus 1812 which goes to all five FPGAs.

The Master FPGA 1802 applies RESET to the ADC 1606 during frame sync (a single tick of the 1× clock) so that the internal ADC clock divider remains synchronized to the DDS-generated 1× clock. The local bus (e.g., connection to a PCI data bus) uses multiplexed address/data pins to conserve pin-out. The FPGA 1802 has an internal address counter to handle burst transfers where the target address is presented only at the beginning of the burst. The bus interface device is a commercially available device, such as a PLX 9054, which includes two chaining DMA controllers. They can move data rapidly into the FPGA frame buffers. Since successive video lines go to different FPGAs (each with its own address space) DMA transfers of video data typically occur one line at a time.

Drive Block Slave FPGAs

Usually, the four 'slave' FPGAs in the drive block are configured identically, except that each gets its own chip select strobe from the Local Bus control PAL. The circuitry is identical to the master FPGA except that there are no controls for the A/D converter and its I-Q Modulator.

DLL Assignments

Each FPGA has four clock DLL circuits and four primary distribution networks for these clocks. For the Drive block FPGAs, the first clock is a video input 1× clock: at 54 MHz (for SXGA applications). The DLL is configured as an input clock repeater, thereby removing clock input delay from the internal clock network of the FPGA. All FPGAs work from copies of the same clock. The second clock is a local Bus clock at a frequency of 25 MHz for the exemplary implementation. The bus clock controls transfers of data to/from the PCI bus controller. In addition, internal timing of most aspects of the FPGA (except A/D receive and AOM DAC output) derives from the bus clock. The third clock is a SyncRAM clock that is a copy of the primary internal clock. A DLL acts as an output clock repeater so that the clock to the SRAM is substantially identical to the internal FPGA clock. The fourth clock is a scanner clock: at a nominal frequency of 37 to 74 MHz (for four beam SXGA). This input utilizes a dedicated clock pin and clock buffer, but is not assigned to a DLL according to the device specification. As described previously, each FPGA works at the phase angle of its individual I-Q Modulator for reliable data transfer from the FPGA to the AOM output DAC. During vertical retrace, all I-Q Modulators are set to a fixed phase to facilitate receiving the MRS Frame Sync signal.

In an alternative approach the clock that drives the SyncRAM chips can be supplied directly at card level, using a standard clock buffer driven by Local Bus Clock.

FPGA Contents

Display Clock Frequency for 4 Beam SXGA

The exemplary embodiment described herein relates to an SXGA display format of 1280 pels by 1024 lines at 60 Hz refresh rate with a 16 KHz scanner using 5 beams per color to support the SXGA display. While this is one approach, one skilled in the art will recognize that the techniques described herein can be adapted for fewer or more beams, for different resolutions, for different scanner frequencies or configurations, or for other applications. In one current embodiment, the display portion of each scanner oscillation covers 33% of the scan time or 120 degrees of rotation. The 16 KHz scan rate results in a 62.5 usec period giving a display portion of 20.8 usec, creating 1280 pels at an average rate of 61.4 MHz. Since the beam velocity profile is sinusoidal, it is useful to determine the minimum and maximum resulting clock rates. This can be determined by considering the velocity curve from −60 degrees through zero degrees (screen center) to +60 degrees. The average velocity in this interval is 0.827 of peak. The minimum velocity is cos(60)=0.5 of peak. This results in a peak dot rate of 74.2 MHz (13.5 ns) and a minimum dot rate of 37.1 MHz (27.0 ns). The instantaneous velocity equals the average velocity at 34.2 degrees from screen center, i.e. 275 pels from the edge of the display.

Source Clock Frequency for SXGA

The following description utilizes VESA Monitor Timing Standards. One skilled in the art will recognize that the approach described herein can be applied to other formats or standards. The VESA standards are:

1280 pels×1024 lines×60 Hz display
    1688 pels×1066 lines total frame format
    Vertical frequency: 60.020 Hz=16.7 msec.
    Horizontal frequency: 63.981 KHz=15.6 usec
    Dot clock: 108.000 MHz=9.26 nsec.

Input BlockRAM Allocation and Data Rate

As noted above, in this embodiment, the input BlockRAM has 10 BlockRAMs, each of which provides 4096 bits of configurable dual port memory. Two BlockRAMs configured for 8 bit inputs buffer pels incoming from the A/D converter. Each RAM provides 8 bits×512 words of storage, allowing the BlockRAMs to buffer 1024 pels from the video source, i.e. 80% of a scan line. Since each FPGA accepts only one video line out of four, the 1024 pel FIFO provides sufficient storage to smooth the incoming pels down to nearly 25% of the line rate. The following is a typical computation of the buffer capability:

1280 pels@108 MHz=11.9 usec
    Four lines@15.6 usec=62.4 usec
    Smoothing ability of an 80% depth FIFO is 5:1, extending the available processing time to 5×11.9 usec=59.3 usec (less than 4 line times).
    The resulting average write rate to SyncRAM is 59.3 usec/1280 pels=21.6 Mbytes per second.

The two BlockRAMs are configured to have 16 bit outputs, resulting in a total width of 32 bits to match the data path width of the external SyncRAM. The input rate of the FIFOs is then 54 MHz (50% of dot rate) and the output rate is greater than or equal to 5.4 MHz.

Output BlockRAM Allocation and Data Rate

Though the display output data width is 10 bits, conventional BlockRAMs are configurable to 1, 2, 4, 8, or 16 bits. Accordingly, an efficient system could use two BlockRAMs as a 32 bit wide FIFO containing three 10 bit pels×256 words deep=768 pels. Because the commercially available have adequate resources, the current system uses a simpler scheme with three BlockRAMs configured as 4 bits×1024 words for a total of 12 bits×1024 words. Once again, the FIFO provides a depth of 80% line size and can smooth the output rate from its peak of 74.2 MHz down to its average of 1280 dots per 62.5 usec mirror oscillation. Consequently, the number of pels per second is 20.5 Mpels/sec. This sets the SyncRAM fetch rate at 5.1 Mwords/sec (4 pels per fetch) and the data output computation rate at 20.5 MHz minimum.

SyncRAM and Pel Computation Cycle Rate

Peak SyncRAM traffic is 21.6 Mbytes/sec input plus 20.5 Mbytes/sec output plus any lost cycles, housekeeping traffic (table reads), and PCI bus traffic. The input and output rates are unequal because the input rate is slightly peaked during line receipt. For practical systems, the peak SyncRAM demand is typically slightly higher than the sum of the input and output rates, i.e. 42 Mbytes/sec=10.5 Mwords/sec.

For the current system, the SyncRAM and pel computation frequency are set to 25 MHz, which is a relatively low frequency that exceeds the 10.5 MHz SyncRAM rate and the 20.5 MHz computation rate determined above. If it becomes desirable to support a full bandwidth PCI bus in certain displays, the clock rate can be increased to a 40 MHz clock rate. However, for simplicity and stability, the present embodiment, uses the lower 25 MHz frequency.

Video Data Path

Figure 19:
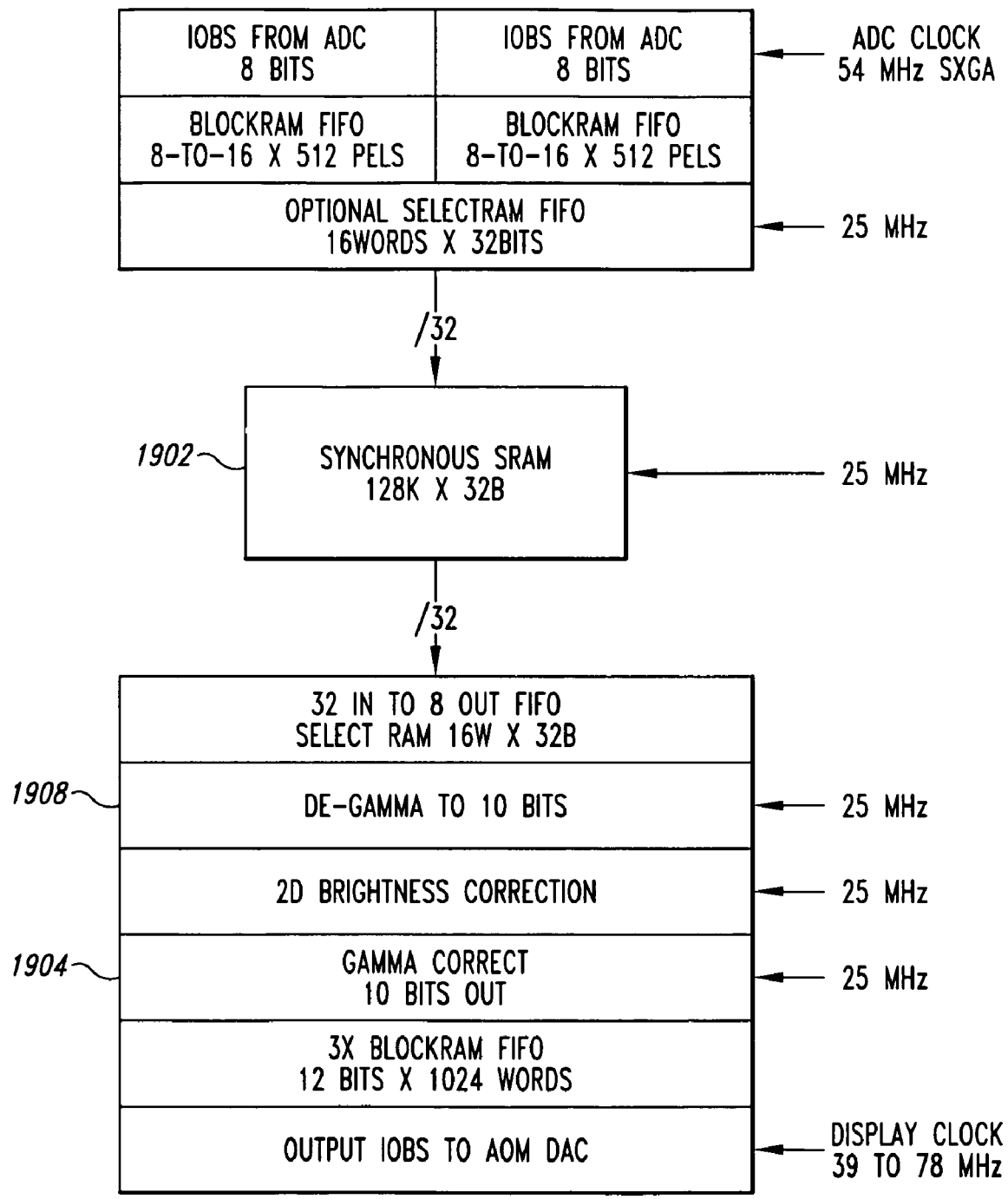
FIG. 19 is a diagrammatic representation of pixel dataflow in the display.

The video data path is shown in FIG. 19. No computations are performed on input, just pel receipt and buffers prior to storage in the SyncRAM.

De-Gamma Correction

Pels retrieved from SyncRAM 1902 are de-Gamma corrected to remove pre-emphasis from the video source data. The de-Gamma lookup is fixed and can be performed in a single BlockRAM lookup table 1908 as 8 bits in (256 words)×10 bits out. The dual port BlockRAM can be loaded from the PCI bus (port #1) and used as a lookup table for pel computations (port #2). This permits an exact mapping with minimal circuitry.

Brightness Correction via Parabolic Interpolation

The display beam velocity profile is a sinusoid due to the resonant nature of the scanner. The system scanner uses about 120 degrees of the scanner sweep, resulting in a 2:1 variation of beam velocity from the edge of the display to the center, as calculated above. This changes the dwell time of the beam for each pel in a horizontal line. Left uncorrected, pels at the edge of the screen (high dwell time) would appear brighter than pels at the center of the screen (low dwell time).

Figure 20:
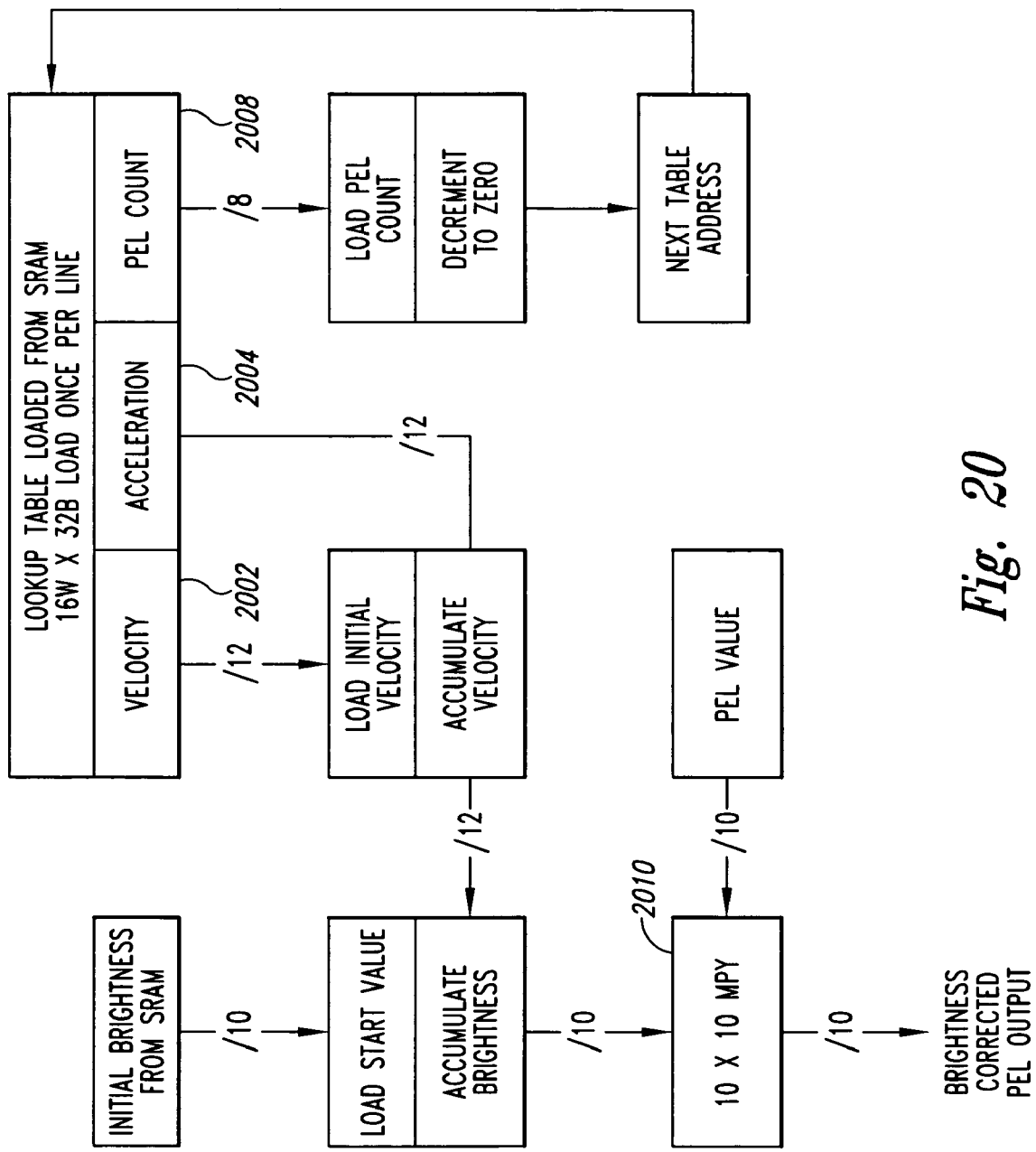
FIG. 20 is a block diagram of a brightness correction circuit for compensating for brightness variations caused by variable scanning velocity.

To produce a smoothly varying correction factor for pel brightness, the system uses 'parabolic interpolation by double accumulation,' as shown in block diagram form in FIG. 20. The double accumulation method provides a very good fit for the expected sinusoidal beam velocity profile, with only a few table lookup parameters distributed over the width of a scan line. In one format, the system uses a 16 word table using 32 bit entries (the size of a SyncRAM word) with the following parameters:

Velocity (slope) parameter 2002: 12 bits
    Acceleration (curvature) parameter 2004: 12 bits
    Pel count 2008: 8 bits The pel count provides a distance over which to use the velocity and acceleration parameters. This makes it easy for the interpolation controller to determine when to provide a new parameter word. It also permits using a very long segment where possible, or several short segments to cover some unusual circumstance. For a truly sinusoidal scanner velocity profile, 6 segments over 120 degrees can provide adequate accuracy.

FIG. 20 shows how the parabolic interpolation method is used for brightness correction. After computing the brightness correction factor for a given pel, the system performs a 10×10 bit multiply 2010 to adjust the pel brightness. By loading a different lookup table for each sweep of the display, the system performs a 2D brightness correction which accounts for slow variation of brightness across the display (typically having radial symmetry) caused by imperfections in the optical system.

Gamma Correction

In conventional CRT systems, gamma correction is usually applied to outgoing pels to adjust for CRT brightness response and the non-linear aspects of human visual perception. The Scanned Beam Display has no phosphors for which to correct, but the system can still accommodate viewers' response characteristics and variations in the optical parameters or wavelength responses of the systems. Returning to FIG. 19, one implementation of the Gamma table is a direct lookup using three BlockRAMs 1904 to construct a 1024 word×12 bit table. This supports input and output words of 10 bits (corresponding to the bit depth of the AOM DACs) and requires essentially no support circuitry. Like the De-Gamma table, this table can be loaded directly from the PCI bus via software and it provides a transformation of acceptable precision.

Pel Data Path Summary

Throughput and computational cycle rate for the data path are greatly eased by judicious use of BlockRAM elements as data buffers or as lookup tables. Two BlockRAMs are allocated for a pel input FIFO and three BlockRAMs for a pel output FIFO. These bring the required clock rate down close to the average data rate for each process. In the computational path, the De-Gamma transformation is accomplished with a single BlockRAM lookup table and the Gamma transformation uses three BlockRAMs for its lookup. Altogether, this accounts for nine of the ten BlockRAMs in the FPGA. Where it becomes desirable to reduce the number of allocated Block-RAMs, the Gamma and De-Gamma computations can be changed to use a smaller SelectRAM lookup table and a piecewise linear approximation requiring a small multiplier to recovers four of the BlockRAMs.

Display I-Q Modulator Control

To maintain beam alignment throughout the image, it may be useful to adjust the display clock phase fairly often during each sweep. One straightforward method is to load a linear interpolation table from SyncRAM during each retrace, and compute new settings for the phase DACs every few pels. The DAC outputs are each 8 bits, so if a BlockRAM buffers these outputs, the system can hold 256 settings. Then, the system can update the display clock phase every four pels (320 times per sweep) so that the updates are small and the output FIFO is 80% as deep as the total number of updates. The lookup table structure is 16 words of 32 bits as follows:

Cosine DAC slope: 12 bits
a Sine DAC slope: 12 bits
Number of 4 pel iterations: 8 bits The first table entry can be executed one iteration before the start of scan (duration of one iteration) to move the initial cosine and sine values from zero (default) to the true starting phase. Subsequent table entries are used as required to move piecewise along the phase compensation curve set up by the programmer. Like the brightness correction table, the phase table takes up about 4% of the external SyncRAM capacity and occupies a single SelectRAM structure inside the FPGA. By reloading the table on every scanner sweep, it is possible to correct for a number of different geometric distortion mechanisms in addition to the fundamental job of maintaining good beam alignment.

Two Beam SXGA

In some cases it may be desirable to operate the scanner in bi-directional mode at an increased frequency to produce a smaller and less expensive display system, with fewer beam alignment problems. One of the DACs can be programmed to provide the forward sweep data (while the other is set to zero output) and program the other DAC to provide the reverse sweep data. Summing the outputs provides a bidirectional driving circuit.

In this configuration, each of the four active FPGA cells deals with only one video line out off every four and the previously described SyncRAMs provide enough capacity to buffer a full frame of data with the clock rates of the FPGAs remaining at their present comfortable frequency.

Timing

As discussed above with reference to FIGS. 16 and 17, the Timing block contains two very similar master clock circuits, one for the video input clock and another for the scanner output clock. Each clock is formed by a Direct Digital Synthesis (DDS) chip 1450, 1750 with its supporting filters and amplifiers, The clocks drive lines which deliver differential timing signals to the three Drive blocks. The Sine and Cosine outputs of the DDS chip, enable precise local phase adjustments at each video A/D converter or AOM drive DAC. These adjustments facilitate accurate conversion of incoming video and good beam alignment in the display.

The clocks on the Timing Card are governed by synchronization information received from the video source (HSYNC) and from the scanner (MRS-Sync). As described previously herein, the system uses a high speed A/D converter to characterize the arrival time of each sync, thereby permitting phase determination to within a small fraction of the clock period.

Figure 21:
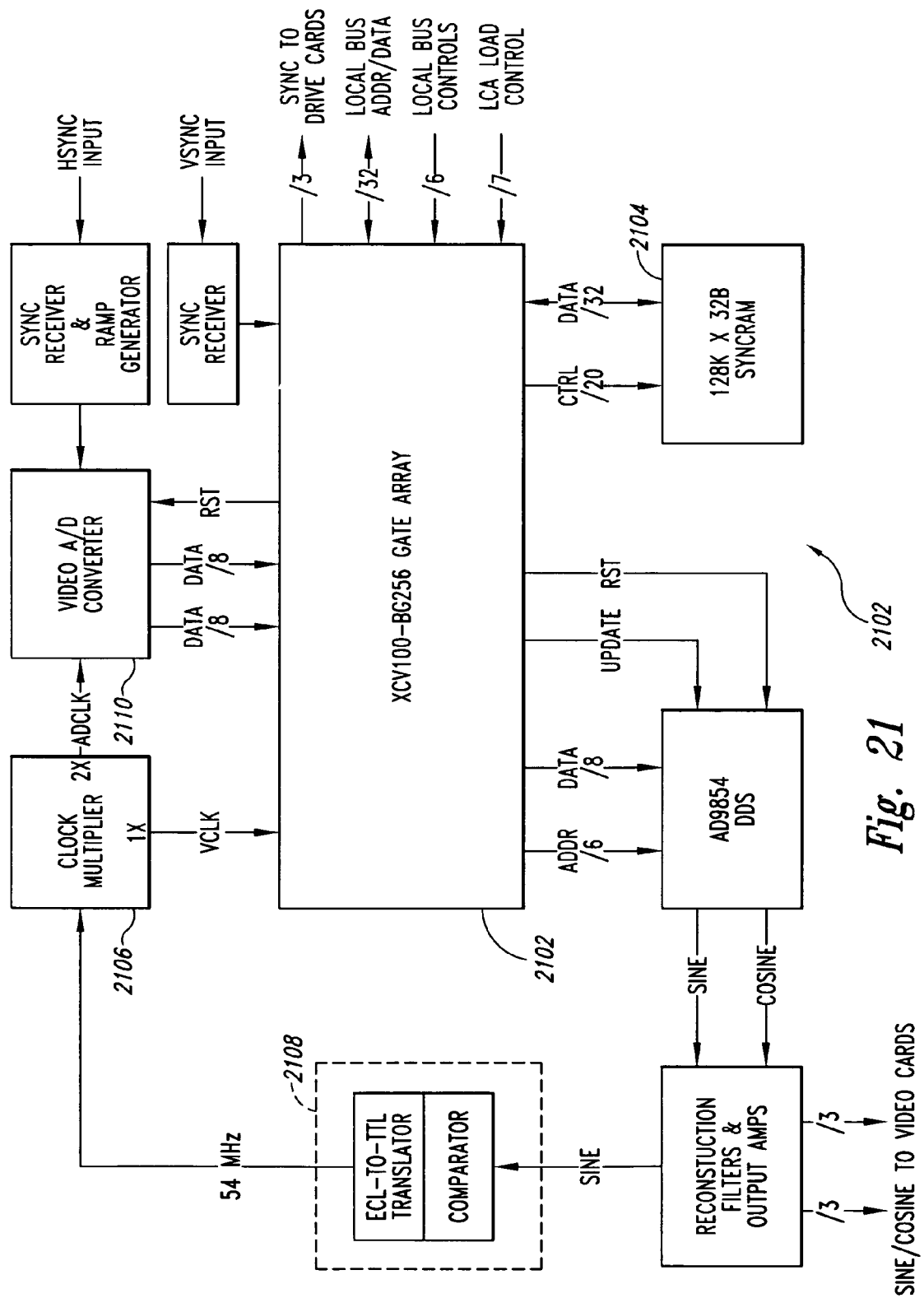
FIG. 21 is a block diagram of a video FPGA.

The basic circuit configuration for the video input clock is shown in FIG. 21. A very similar circuit is used for the display clock FPGA, as presented in FIG. 22. Focusing on FIG. 21, essentially the same configuration is used for scanner sync, with slight differences in the way that the sync is received and presented to the A/D converter. The basic FPGA cell 2102 with 128K×32B SyncRAM 2104 and PCI bus interface is the same as on the VRD Drive block. A clock doubler 2106 between the I-Q Modulator 2108 and the A/D converter 2110 raises the A/D conversion rate and helps to make a more accurate measurement of the Sync arrival time. With appropriate components, measurement accuracy can be better than 100 psec.

This approach uses simple lookup tables driven by software to simplify FPGAs design. In some applications, on the fly computations and embedded clock servos can perform the same function.

The video clock generator tracks the phase and frequency of the dot clock in the video source. Since the sender's intended pixel rate (108.00 MHz for SXGA) is known, the DDS is programmed to this frequency. The local time base is a crystal oscillator with a frequency accuracy of about 50 ppm. For the same level of accuracy at the video source, there is up to 100 ppm difference between the video dot clock and the initial 108 MHz time base. This amounts to a maximum error of about 1.6 nsec per video line (15.6 usec line rate).

This may approach the point where shot-to-shot jitter in HSYNC transmission or detection is significant.

While the description below relates to one type of proportional integral compensation technique, other P-I known techniques may be adapted for application to the invention.

Startup and Initial Frame Lock

At startup, the system does not necessarily assume a known phase relationship between the two clocks. The frame counters (driven by horizontal and vertical format registers) just start counting at time zero, and are not yet locked to the sender's video frame. A command register bit in the FPGA (set by software) prompts the FPGA to 'snap to phase' by reloading its vertical and horizontal format counters whenever VSYNC is true and it also encounters the HSYNC transition. This brings the frame format into approximate synchronization with the sender.

Error Detection

Once the system achieves frame lock, the system can determine relatively precisely when each HSYNC pulse should arrive. A command bit in the FPGA selects which edge of HSYNC should be used for timing purposes depending upon stability concerns or programmer's preference. For a zero error case, the HSYNC pulse arrives precisely at the expected tick of the 108 MHz clock and results in an A/D reading of exactly mid-scale. The actual error is defined by (# of 108 MHz ticks early/late)[plus](A/D difference from mid-scale)

This is a signed value which represents early or late arrival with a precision of about 40 psec. Because the two clocks are relatively stable, the system can be more responsive to persistent errors than minor indications of HSYNC error.

Proportional Phase Controller

The FPGA stores the instantaneous HSYNC arrival errors and also accumulates the sum of these errors. To the extent that these errors have a zero mean, this integral error will tend toward zero. In response to non-zero errors, the software makes a compensating phase adjustment to the DDS. The DDS chip has a 14 bit phase adjustment register which can be updated without affecting the basic frequency setting of the chip. The FPGA holds its own copy of the phase word. In practice, the system begins with the FPGA computing the instantaneous error or HSYNC pulses. The instantaneous error is limited (clipped) to ±1 pel and a filter forms a best estimate of the HSYNC arrival error. The filter is a single pole low pass filter computed as:

$$FILTER'=FILTER+(DIFF-FILTER)/2**N,$$

where DIFF is 8 bits plus sign, representing instantaneous errors in the range ±1 pel time for the horizontal timing. This is a fractional value closely derived from the 8 bit A/D value measured during HSYNC arrival. FILTER is a 16 bit signed integer, likewise representing a fractional (phase) error. The divisor of 2**N is a shift count, user adjustable from 0 to 7 counts. The shift count sets the corner frequency of the filter, ranging from instantaneous response (N=0) to a 3 dB point at 128 samples (N=7). A typical setting of the shift count is N=4, which might be considered as an averaging window of 16 lines, after which time a persistent HSYNC arrival error results in FILTER=DIFF.

The value in FILTER is the 'proportional' error term of the clock control loop. It represents a short term error which that is addressed by short term correction. Note that the video pel clock is twice the DDS source clock, so the ±1 pel range of FILTER translates to a DDS phase error of ±180 degrees. The top 9 bits of FILTER act as the address input to a BlockRAM of 512 words×8 bits, looking up an 8 bit phase correction of up to ±180 degrees which is applied to the DDS. Since the system uses 256 counts to cover the range ±1 pel, the phase adjustment precision is $1/128^{th}$ pel, equal to 72 psec for the 108 MHz SXGA pel rate. The contents of the BlockRAM are set by the programmer. Hence the user can control the response time constant via the 2**N filter divisor and the response magnitude via the BlockRAM contents.

Integral Phase Controller

The instantaneous phase error (DIFF) is accumulated to measure the integral error of the clock loop. This is computed as:

$$INT'=INT+DIFF*2**INTGN$$

where DIFF is the 8 bits (plus sign) instantaneous error of up to ±1 pel, and INT is a 40 bit accumulator. The parameter INTGN is set by the programmer (0 to 7) to set the gain of the integral control loop. DIFF is left shifted to 40 bits before the summation is performed. The result is that a persistent (i.e. uncorrected) error of 1 pel would require about 8000 video lines (5 frames) to saturate the integrator.

The integral error will be used almost directly as the frequency tuning word for the DDS chip. To achieve a smooth startup, the initial value of INTEG is set by the programmer to correspond with the expected operating frequency (54 MHz) of the DDS chip. The DDS control loop starts at this point and then makes small adjustments to maintain lock to the incoming HSYNC events.

The bit width of INTEG implies a time constant for the integral control loop. At the lowest setting of INTGN, a maximal HSYNC arrival error (one clock tick or greater) appears with a bit weight of 2**(−31) viewing INTEG as representing a fractional value. An operating frequency of 54 MHz requires the DDS frequency tuning word to be set to about 0.18 so the maximum change in frequency is about 170 ppm per second. The programmer can increase the tracking rate up to about 2% per second but this is usually not required, since the expected tuning range is only 100 ppm overall relative to the crystal in the clock source.

DDS control is established by updating the frequency tuning word (FTW1) in the DDS chip. A new frequency tuning word is computed a few clock ticks after each HSYNC event by summing the integral error register (INTEG) with a proportional error contribution:

$$FTW=INTEG-FILTER*2**PRPGN$$

The 16 bit proportional error term (FILTER) is left shifted 0 to 7 times based on a proportional gain register holding the proportional gain constant PRPGN. The 22 bit result is sign extended to match the 40 bit INTEG parameter before the subtraction is performed. The resulting 40 bit value is used to update the high order bits of the 48 bit DDS chip FTW1 register.

Scanner Clock

Figure 22:
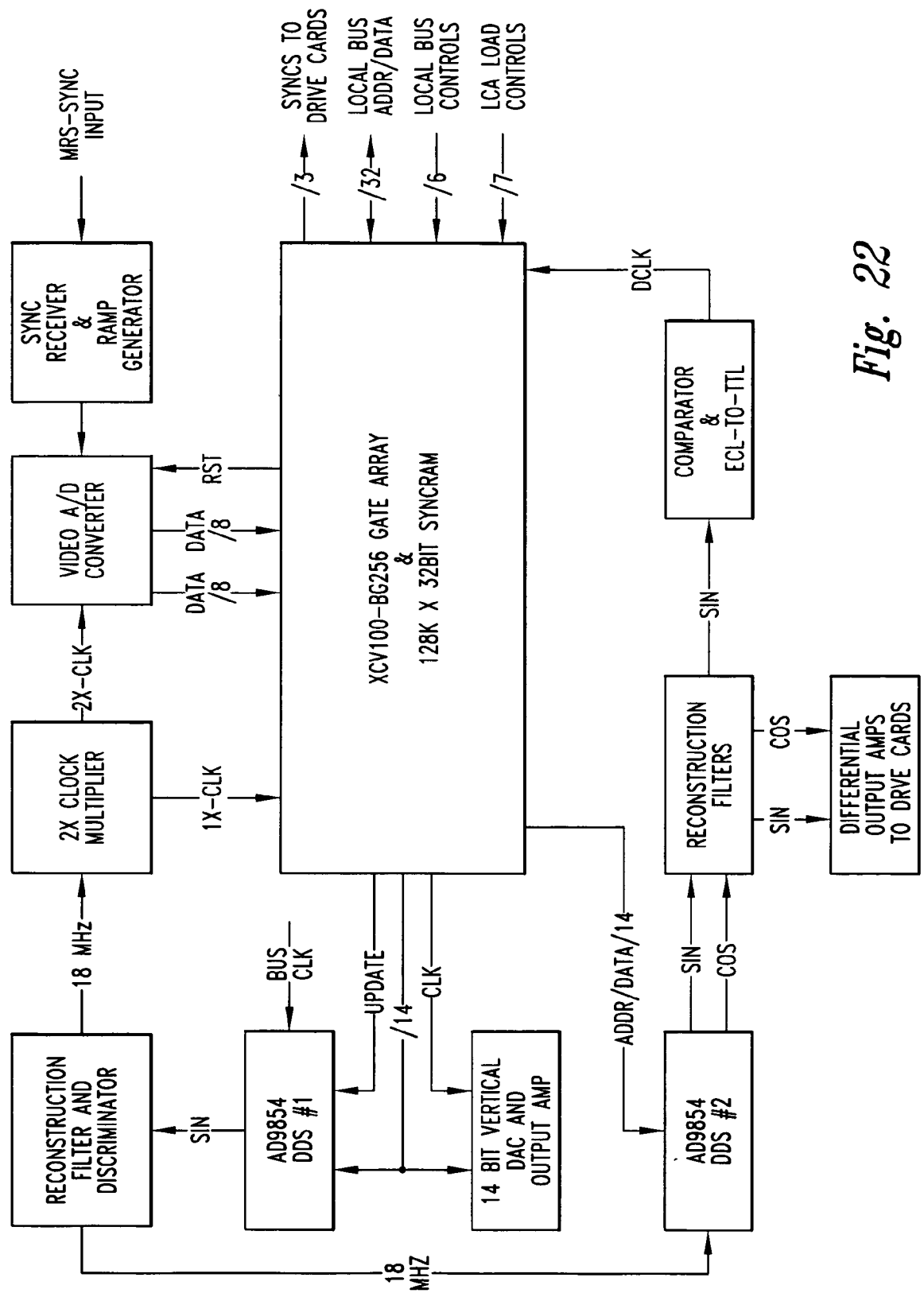
FIG. 22 is a block diagram of a clock FPGA.

Turning to FIG. 22, scanner clock control is similar to the video clock; but, can also accommodate periodic frequency variations of the resonant scanner. Synchronization issues aside, the exemplary method can produce a highly repeatable clock with a specific (sinusoidal) frequency profile.

For a ±60 degree SXGA display sweep, this dot clock frequency starts at about 37 MHz at the screen edge and progresses to twice frequency (74 MHz) at the center of the display. Then it drops again to 37 MHz at the far end of the sweep. The scanner angular velocity continues to fall as the mirror approaches the end of its oscillation, and eventually the velocity goes to zero at +90 degrees from screen center.

The scanner clock circuit will attempt to emulate this behavior during the on-screen portion of the scan. This sets a minimum clock frequency at the screen-edge to 37 MHz, which is well above the low frequency limit of the various DLLs and PLLs in the system.

While one approach may be to simply hold the minimum frequency during the return scan, the system instead allows control of the frequency during the "dead" period. This allows the system to be adapted for bidirectional scanning. Consequently, when MRS sync arrives at the center of the return sweep the clock is at the maximum frequency, thereby improving phase measurement precision.

Linear Approximation to the Sinusoidal Frequency Profile

While the true beam velocity profile of the scanner might not be purely sinusoidal due to nonlinearities or higher order effects, a sinusoidal approximation provides a good basis for initial computations. The error criterion may not be significant in some applications, since the eye is fairly insensitive to geometric distortions in most images. Other applications, such as targeting displays may have more stringent geometric fidelity requirements. Currently, the selected error criterion is one part in a thousand (1000 ppm) from screen center to screen edge (about one half pel).

Figure 23:
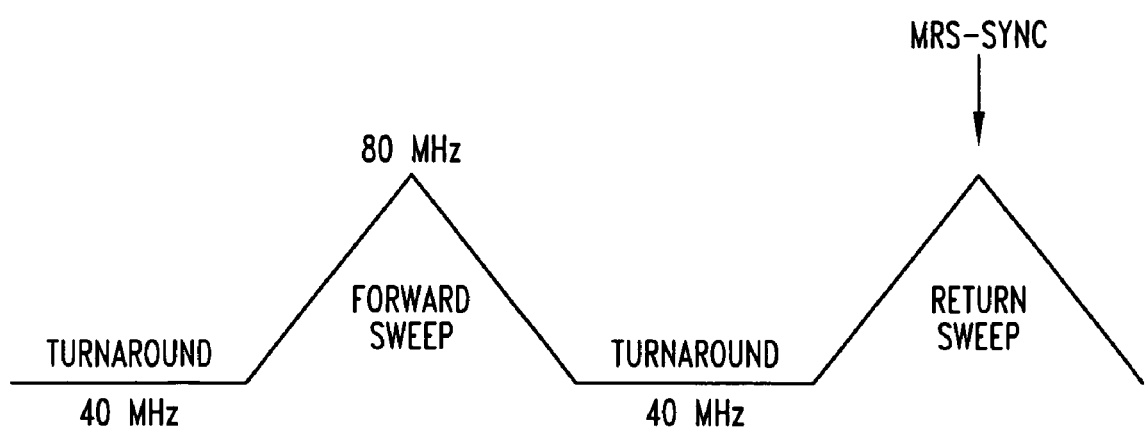
FIG. 23 is a diagrammatic representation of increasing in decreasing clock frequency chirp during forward and reverse sweeps.

The inventors have modeled sine values using interpolation techniques and identified a maximum error of about 7% for a single straight line approximation over a 0-60 degree range of sine values when errors are zeroed at the endpoints. A six segment approximation of the scanner frequency profile is presented in FIG. 23 for bi-directional scanning. A 10 segment fit (every 6 degrees) over the same interval yields an error of 1200 ppm. By altering the linear intercepts the error can be better distributed, thereby cutting the maximum error in half. Thus, a fixed interpolation span of 6 degrees (20 segments over the screen width) would produce an error of 600 ppm near the screen edge.

The Direct Digital Synthesis chip can implement this piecewise linear approximation with adequate accuracy and precision. The DDS has a linear sweep mode where the frequency word is incremented by a (signed) delta value once every (programmable) time constant. Thus, a single command to the DDS is sufficient to establish a specific frequency point and slope. The frequency tuning word and the frequency delta word are both carried to 48 bit precision and the ramp rate time constant is carried to 20 bits, to provide ample numerical precision. In an alternative approximation using a fixed interval 20 spline method the DDS parameters are updated once every 60 pels or so. Additionally, the number of updates can be reduced near screen edge where the frequency slope varies more slowly. This reduces the number of splines without degrading accuracy materially.

Phase Errors Due to DDS Update Jitter

Computational accuracy of the DDS does not limit the precision of the frequency profile. Indeed, the DDS can sustain a much higher parameter update rate than the 60 pel intervals cited above, so even better accuracy is available if necessary.

Phase errors due to update jitter typically refers to impacts on identicality of successive sweeps of the clock waveform. These may result for example, from time quantization errors introduced by the 300 MHz internal time base of the DDS itself. As commands arrive at the DDS chip, the commands are re-synchronized to the DDS internal time base. For a command on a particular tick of the present display clock, the actual change might occur immediately, or up to 3 nsec later.

Dual DDS Time Base

The timing jitter calculated above would disappear if the rising edge of the DDS internal 300 MHz clock occurred exactly at the screen edge for each display sweep. To insure this result, each display sweep m contains an exact integral number of 300 MHz clock ticks. For the four beam SXGA system, a sweep lasts approximately 64 usec, or about 19,200 ticks of the 300 MHz DDS internal clock. Changing the clock by as little as 50 ppm can thus 'pull' an arbitrary 300 MHz clock into synchronization with the sweep.

Alternatively, an adequate solution to the clock synchronization problem is to insure that the input clock to the swept sine DDS is aligned to the mirror sweep. A DDS circuit identical to that of the video HSYNC produces this clock, as shown in FIG. 22. The DDS produces an output frequency of approximately 18 MHz. This clock drives an A/D converter by means of a clock doubler, producing a 36 MHz sample frequency. The A/D samples MRS-Sync to determine its arrival phase with respect to the clock. Then a proportional-integral control loop inside an FPGA adjusts the DDS phase/frequency to insure a stable lock between the clock and the sync signal.

The 18 MHz clock locked to MRS-Sync drives a second DDS circuit (internal 16 multiply to get 300 MHz) which produces the sinusoidal clock profile that matches the MRS mirror velocity. A synchronized input clock eliminates problems with jitter in the frequency update process, thereby producing stable sweep-to-sweep results.

Note that DDS #1 is driven by the local bus clock (crystal oscillator). The 18 MHz clock resulting from DDS #1 drives the A/D converter for sampling MRS-Sync, and also drives DDS #2. This second DDS creates the sinusoidal display clock frequency profile that matches the mirror velocity.

Establishing a Frequency Profile

The DDS #2 controls the frequency profile of the display clock. Initially, it seems ideal for the frequency profile for the scanner to remain the same for each sweep of the frame and over time. However, the current system provides the capability to change the scanner frequency profile on a sweep-to-sweep basis. Advantageously, this can permit the scanner control to compensate for some of the geometric distortions in the optics. For instance, if the optics tend to produce a 'fatter' mid-section on the display, the startup corner of the clock profile can be delayed to a bit later on the middle sweeps of a frame along with a slightly higher clock rate for the display on-time. This moves both edges of the toward the center, thereby compensating for the optical distortion.

To permit programmer control over the frequency profile, the string of DDS commands are written into the local SyncRAM. A typical command string to perform a linear frequency ramp consists of a frequency word, a frequency delta and an update rate. These parameters drive the DDS, with about 10 words (depending on the required precision of the parameters). Each DDS word has a 6 bit address and an 8 bit datum. Thus, the DDS command can be stored in a 16 bit memory cell, reserving two bits as flags to the FPGA.

Sync Reception Circuitry

Horizontal sync carries information about pel timing to sub-nanosecond time scale. To measure its phase with respect to the zero degree phase of the video A/D clock, an RC section slows the edge to make an approximate ramp. A video A/D samples the result and the A/D provides a measurement of the position of HSYNC with respect to the sample clock at a resolution of better than 100 psec. This information is used to adjust the phase of the sampling clock for each new line, as well as to tune the DDS frequency to exactly match the frequency of the dot clock in the transmitting system.

MRS sync is received and measured by an identical method except for signal conditioning due to the voltage and drive levels of the MRS sync.

Video Output Circuitry

Filter

The proportional loop attempts to zero the HSYNC phase error immediately following each event. A single pole filter addresses some of the jitter in the measured HSYNC arrival time, by averaging a number of measurements to form our best estimate of the true phase. The filter time constant is 2**FILTN samples where FILTN is in the range 0 to 7. The defining equations are:

$$DIFF<=(128*HS\text{-}ERR)-\text{FILTER}$$

$$\text{FILTER}<=\text{FILTER}+DIFF/(2**FILTN)$$

The equation for DIFF shifts HS-ERR up to be MSB aligned with the 16 bit value in FILTER. The second equation shows the effect of the FILTN setting (0 to 7). Note that if FILTN=0 then FILTER is just set to the instantaneous error (128*HS-ERR). This setting causes the proportional control loop to operate from the instantaneous (single sample) value of the phase error. Setting FILTN=7 makes the system use an estimate based on approximately 128 measurements (this would be a very slow response time). It is expected that useful values of FILTN will be in the range of FILTN=2 (4 samples) to FILTN=4 (16 samples). The programmer can read FILTER at location x/0018 as a means of tracking clock servo performance.

Proportional Control Loop

FILTER is a 'best estimate' of the instantaneous phase error between the DDS output (VIDCLK) and the video source clock. The proportional control loops makes an immediate correction to the DDS frequency based on FILTER. The gain for this correction is contained in the PRP-GN bits of the PID control word. For PRP-GN=7 the top bit of FILTER is aligned with FTW bit 21. It takes 210=1024 DDS SYSCLK cycles for a maximal FILTER value (180 degree phase error) to be promoted into FTW bit 31 (180 degree phase correction). For our SXGA display, the line time is 15.3 usec or 4590 SYSCLK cycles. PRP-GN=7 provides an excess gain of about 4.5:1 with respect to the required correction. Setting PRP-GN=0 aligns the top bit of FILTER with FTW [14]. This requires 217 SYSCLK cycles for a full 180 degree correction, representing a fractional response of only 1/29 compared to the error signal.

Integral Control Loop

Once per line, the instantaneous error (HS-ERR) is gained and added to the integrator (INTEG). The INTEG register must be pre-loaded with the anticipated DDS tuning value before enabling the control loop, else the first update of FTW would drive the DDS to essentially zero frequency. If the initial setting of INTEG provides a good frequency lock, this integral value will be stable because the measured phase errors will have a zero mean value. But if a persistent phase error occurs due to a frequency mismatch, INTEG will grow (or diminish) until the DDS output frequency matches HCNT times the HSYNC event frequency.

The integral gain (INT-GN) controls the time response of this control mechanism. Based on 4590 SYSCLK cycles per HSYNC, a persistent 180 degree phase shift from one event to the next requires a compensating adjustment to bit 19 of INTEG. Setting INT-GN=7 causes the MSB of HS-ERR to be summed into bit 7 of INTEG (with sign extension up to bit 31) resulting in a time constant of 2**12=4096 lines or about four video frames (15 Hz). Reducing INT-GN to zero extends the time constant to about 500 frames ($\frac{1}{8}^{th}$ Hz). Inside the FPGA, guard bits below INTEG[0] protect against loss of precision at low gain settings.

Display Clock Control

Frame Counter Module

One component stored in memory is a frame counter module that keeps track of the number of frames for differing line lengths or numbers of lines. This allows the system to keep track of the frame timing and number of frames for applications where the number of lines may vary.

Also, because the system can store an entire frame of data in a buffer, in an alternative approach the frame counter can provide input to a frame count comparator to allow the system to monitor frames and capture a specific numbered frame or to identify a frame captured in response to a user input. In this approach, a mirror buffer coupled in parallel with the primary system buffer receives the same data as the primary system buffer. When the comparator identifies a specific frame for capture, the mirror buffer rejects further data input, thereby preserving a "snapshot" of the identified frame.

Also, the frame counter can be used with a comparator to identify and block a specified set of frame data from the primary system buffer, thereby effectively frame dropping.

Filter

Returning to the control loop description, the proportional loop attempts to zero the MSYNC phase error immediately following each event. To address jitter in the measured MSYNC arrival time, there is a single pole filter which averages a number of measurements to estimate of the true phase. The filter time constant is 2**FILTN samples where FILTN is in the range 0 to 7. The defining equations are:

$$DIFF<=(128*HS\text{-}ERR)-\text{FILTER}$$

$$\text{FILTER}<=\text{FILTER}+DIFF/(2**FILTN)$$

PI Loop Details

Proportional Control Loop

One skilled in the art will recognize that FILTER is a running 'best estimate' of the instantaneous phase error between the DDS output (VIDCLK) and the mirror period. The proportional control loop then corrects the DDS frequency based on FILTER. To tune the responsiveness of the loop, the correction is subject to a gain dictated by a portion the PID control word. For the exemplary SXGA display, the mirror period is approximately 62.5 usec or 18,800 SYSCLK cycles and the gain is between about 4.5:1 and 1:29.

Integral Control Loop

Once per line, the instantaneous error is gained and added to the integrator to update a register that is originally pre-loaded with the anticipated DDS tuning value before enabling the control loop, to prevent the loop from driving the DDS to essentially zero frequency. If the initial setting of INTEG provides a good frequency lock, this integral value will be stable because the measured phase errors will have a zero mean value. But if a persistent phase error occurs due to a frequency mismatch, INTEG will grow (or diminish) until the DDS output frequency matches times the MSYNC event frequency.

The integral gain (INT-GN) controls the time response of the loop. Based on 18,750 SYSCLK cycles per HSYNC, a persistent 180 degree phase shift from one event to the next implies a compensating adjustment to bit 19 of INTEG. The gain is typically set for a time constant of 2**5=32 lines (500 Hz). Reducing the gain to zero extends the time constant to about 4000 lines (4 Hz). Inside the FPGA, guard bits below INTEG[0] protect against loss of precision at low gain settings.

Although the scanner may exhibit significant temperature drift, on the order of 100 ppm per degree centigrade, typical environmental conditions can be tracked with a control bandwidth lower than 4 Hz. A sample scanner had a harmonic content at frequencies near 2800 Hz, 120/240 Hz, and 25 Hz. The 2800 Hz resonance lies is within the domain of the proportional control loop which, depending on the FILTN setting, will either ignore or respond to disturbances lasting only a few lines. Note that the action of the proportional loop is principally to keep the servo from losing lock (phase control) not to achieve an accurate frequency match to the mirror. Thus, high frequency variations in the mirror period could appear in the video (fortunately the 2800 Hz effect in the sample mirror was small). The 120/240 Hz harmonics are of larger amplitude, on the order of $\frac{1}{8}^{th}$ clock tick per mirror cycle. This represents a periodic shift of about ¼ pel in screen position (at screen center) as the display progresses from top to bottom within a frame. Events in the 25 Hz range were larger yet, exceeding ½ pel at screen center if left uncorrected by the clock servo.

To compensate for any perceived artifacts from these variations, the loop provides integral response extending into these frequency ranges.

The sinusoidal frequency profile is created through a series of linear frequency sweeps (sometimes called FM Chirps) using DDSY. The base frequency is set by data in Frequency Tuning Word 1 (FTW1). The frequency step size is contained in the delta frequency word (DTW). Both of these variables are 48 bit precision. DTW (signed to permit up/down sweeps) is added to FTW1 periodically. The Ramp Rate Clock is a 20 bit register which counts internal clock ticks (resolution of 1 tick) between frequency changes. Thus, the sweep rate depends on both the frequency step size and the ramp rate.

DDSY will operate in internal update mode to keep track of the number of frequency changes occurring during each ramp period. In one approach, the values are set as follows:

A 16 KHz scanner with an 18.4 MHz input clock, corresponds to 1152 clocks/sweep.

A 16× internal PLL implies a 295 MHz internal SYSCLK for 18,432 ticks/sweep

FTW1 is set to twice the input clock or about 36.9 MHz

The Ramp Clock set to 11 (12 ticks per ramp increment).

The update clock is set to 1535 (6 segments of 3072 ticks).

The Delta Frequency Word (DTW) is the principal as the only adjustable parameter for the sweep. A simple program of 6 fixed length segments (i.e. 60 degrees each) and a display width of 120 degrees produces the following frequency profile:

This profile has different three commands, repeated twice to account for the return sweep of the horizontal mirror. While the retrace portion can be eliminated for unidirectional beam writing, the retrace is still provided to allow the system to operate in a bi-directional mode. Bi-directional scanning is described in U.S. Pat. No. 6,140,979 of Gerhard, et al., which is commonly assigned herewith and is incorporated herein by reference.

While the simple two-slope profile does not always provide an especially good fit to the sinusoidal scanner velocity, the resulting geometric distortion in the image is negligible in many cases. For better fit, the number of commands can be increased, for example, 24 fixed length commands can yield 6 different slopes for more accurate fit. For a more compact command list, the command duration parameter can also be varied.

Another feature that may be useful in some applications is the use of slight sweep-to-sweep modifications of the DDSY frequency profile to account for geometric errors in the display. By redefining the frequency profile data for every sweep of the frame (including retrace sweeps in some cases) some or all lines can be expanded, shifted or contracted to compensate for system distortions. In one approach, the optical response of the uncompensated system is calculated, measured or otherwise determined. Then, a DDSY frequency is identified that will compensate for the determined distortion or other determined characteristic. The compensating DDSY profile is then defined according to the identified compensating profile. In a simple, one-element example, if the optical system shortens the apparent length of lines in certain portion of the image field, the DDSY profile can be selected to expand the same lines in a manner that would offset the distortion introduced by the optical system. Similarly, if temperature, aging, or other factors cause differences in the scanner response that produce an apparent optical distortion, the DDSY profile can be modified to compensate.

In the exemplary embodiment the scanner frame sync is delayed by 90 degrees from the mirror sync position, because mirror sync occurs at the fastest point in the sweep, while the system demands are lower when the sync pulse is transmitted to the video blocks at the minimum clock rate experienced during mirror turnaround.

Maintaining Horizontal Synchronization

To allow the Drive Block Class to be set up to count these clock ticks while formatting video data for display, the commands in the frequency profile table produce exactly the same number of DDSY clock ticks per sweep of the scanner. Additionally, the number of display clock ticks per sweep is an exact integer to ease the establishment of each new sweep at the edge of the display.

Where FTW1 remains fixed at the screen center frequency and the profile is controlled totally by DTW1, the system re-computes FTW1 by an amount determined from the data in the phase accumulator. This establishes the error at an acceptable level.

Scanner Vertical Drive

The scanner vertical drive method is 'sweep and park'. The cycle starts with the vertical mirror held stable in its 'parked' position, just off the bottom of the display. At the display frame sync point, a rapid, substantially linear retrace to the top of the display begins, followed by the on-screen portion of the mirror sweep. The mirror then returns to the parked position, where it dwells for an adjustable number of sweeps (to maintain frame lock to the video source) before a new cycle begins.

A four beam display has a 3+ video input lines latency. This means that the mirror is beginning its final (four line) sweep just as the video source begins its final line. VSYNC from the video source will occur on the next line (first off-screen source line) so the system provides this signal during the next-to-last mirror sweep of the display. This establishes a minimum latency of 4 to 8 source lines (122 usec maximum) between the video source and the display. The video source is synchronized to its local crystal and the display is synchronized to the mirror, so the two do not exhibit the same frame time. If the display format is locked (267 sweeps per frame) then a VSYNC arrival in sweep 266 will eventually drift early (end of sweep 265) or late (beginning of sweep 267). To compensate the control system shortens or lengthens the display frame by one sweep to realign with VSYNC by changing the duration of parking.

Once the parking time expires (frame sync point) there is a rapid excursion to the top of the display, an immediate turn-around, and then a more measured approach to the first display line. Essentially linear vertical DAC updates continue throughout the display region until the beam once again moves 'off-screen' and reaches the parking location. In programming the vertical deflection it is important to remember that frame sync will typically occur at the mirror turnaround point=90 degrees from the mirror sync signal. This makes the vertical servo integral in mirror sweeps. Note that in the diagram above the vertical retrace deliberately overshoots the desired onscreen position, then assumes the on-screen slope and enters the display region in a controlled fashion.

The clock for this process is taken from DDSX (VID-CLK=18.4 MHz) which is locked to the scanner mirror. This insures that the vertical DAC updates are synchronized to mirror motion. However, the DDSX output does not accommodate quickly to scanner changes, so there is little chance that any jitter or oscillations will be imposed on the vertical sweep.

Communication of Frame Sync to the Video Blocks

Pipeline delays in DDSY and output delays through the D/A and filter can make it difficult to determine exactly the frame sync timing and phase at the different blocks. To reduce this difficulty, the system delays communication of frame sync by approximately 90 degrees of the mirror sweep. This moves the communication point from the peak SCLK frequency to the lowest SCLK frequency (the flat portion of the profile during mirror reversal). Timing margins are much improved at this frequency.

Video Input

Phasor (IQ-Modulator) Control

There are six phasor (INTERLINE PHASE) cells on the Drive Block. Each phasor accepts two analog inputs representing the Sine and Cosine components of a master clock supplied by the Timing Card. These components are separately multiplied by constants supplied via 8 bit DACs. The results are summed to form a re-phased analog signal which is subsequently discriminated (zero crossing detector) to generate a digital clock. The analog portion of this process, called an IQ-Modulator, is described by:

Output=$X \sin(wt) + Y \cos(wt)$ where X=cosine of desired phase angle, and Y=sine of desired phase angle. X and Y are represented as signed 8 bit fractions, so 127 approximates +1 and −128 equals −1. Inside the LCA, each of the phasor control word is structured as an 8 bit integer (0 to +255) which maps the range 0 degrees to +359 degrees. Phasor control words specific to the input and display processes are described below.

Video Input Format

In this embodiment, the Video Block does not perform image interpolation or frame format conversion, so the video input and display output formats are set to represent equivalent viewable areas. The data may differ. For example when the output frame uses multiple beams, hence fewer mirror sweeps, to represent the input image, the format will be adjusted.

Video IQ-Modulator Control

The phase of the digitizer clock (ADCLK) is adjustable via an IQ-Modulator which permits separate phases for communication (receipt of frame sync from the Timing Card) and data acquisition (A/D conversion). These parameters are set by the user as VID-PHSC (communication) and VID-PHSD (data). The ideal communication phase may vary somewhat from one Video Card/beam to another in the system.

Display Output

Display Frame Format

The display clock (signal name SCLK) is provided by the Timing Block as a sine/cosine analog pair. Each Video Block LCA has a dedicated IQ-Modulator and discriminator to produce a phased clock specific to one light source modulator within the display.

Display IQ-Modulator Control

The phase of the display clock (SCLK) is adjustable via an IQ-Modulator which permits different phases for communication (receipt of frame sync from the Timing Card) and display. Display phase is set via the IQ-Modulator table in SRAM. Communication phase can be determined by varying the DSP-PHSC setting, waiting at least one frame time, and checking the DSP-FED bit. DSP-FED is connected to a detector working from the falling edge of SCLK. Control of beam position throughout the display is provided by the IQ-Modulator table stored in SRAM.

Pel Processing

De-Gamma Correction

Input pels from the A/D converter are subjected to a de-Gamma correction to return them to a linear representation. This is performed in a lookup using a BlockRAM which is configured as 256 words by 10 bits.

Brightness Correction

Because the time required to produce each pel on the display varies sinusoidally with screen position, the system provides a brightness correction. Otherwise, pels at the display edges (slower clock=larger dwell time) would be brighter than those at the screen center (faster clock=smaller dwell time). While the brightness profile and other characteristics may be substantially the same for every line, this may not always be the case. For example, as the mirror moves to different angles, or as the optical path length changes for different paths, the optical loss or chromatic variation through the system may change. Consequently, the system can vary the brightness and gamma correction on a sweep-to-sweep basis.

Brightness correction is computed from a table stored in SRAM.

Updates to the brightness multiplier occur on every pel, so the system uses an 11 bit Count variable that provides a range of 1 to 2048 pels (sufficient to cover an entire display line in one command). The correction for mirror angular velocity which is performed in the Timing Block is based on a series of linear splines. A typical control mechanism is to use linear splines of the same size in a Brightness table in memory, since this matches the actual dwell times of the generated pels.

Gamma Correction

Following brightness correction, a new Gamma factor is applied to each pel to correct for human visual response. This is performed with a BlockRAM lookup table GAMMA. The GAMMA memory is configured as 256 words×16 bits. The system control circuit uses a simple linear interpolation based on stored Gamma correction data to perform the complete Gamma conversion.

Bi-Directional Scanning

As discussed above, in some applications it is desirable to use bi-directional scanning. Bi-directional scanning is accomplished by assigning two LCAs to each beam, one for the forward sweep and one for the reverse sweep. Outputs of the two LCAs are combined to make the composite bi-directional scan. For a two beam bidirectional display, this involves four LCAs. The forward scan setup is the same as described above. For reverse scan, the display line length is loaded to the LINSZ register, and the data can then use LINSZ to retrieved data in reversed word order.

Figure 24:
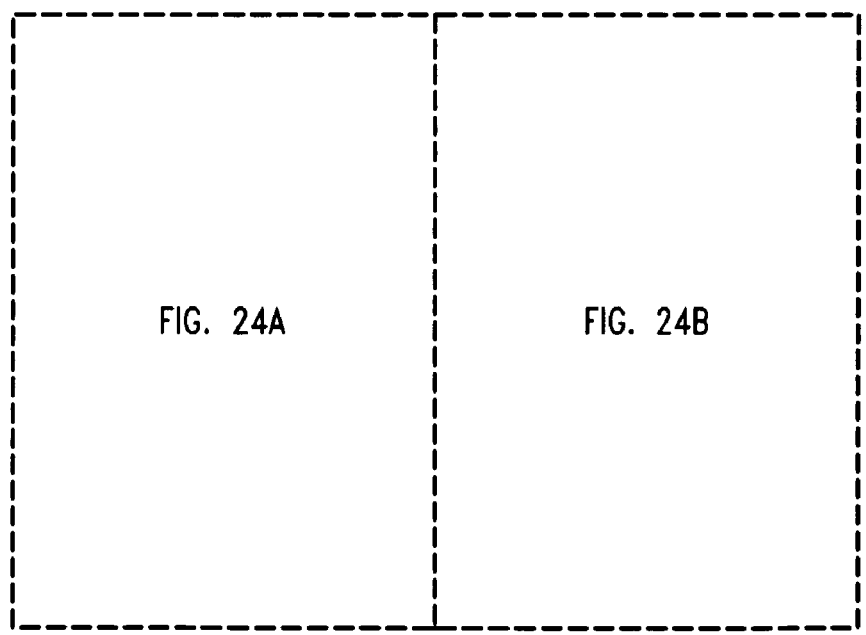
FIG. 24 is a block diagram of an overall display including an embedded processor.
Figure 24A:
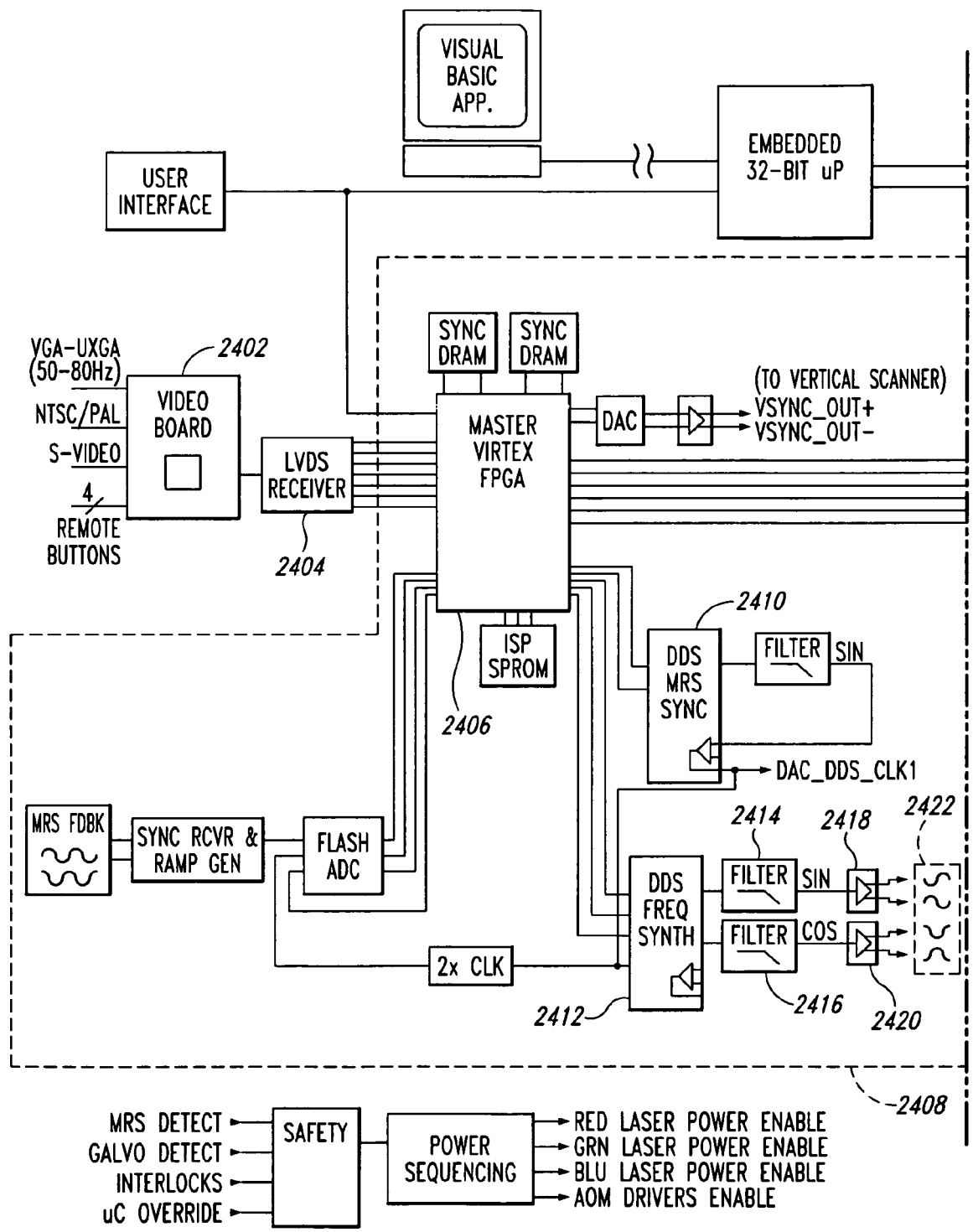
Figure 24B:
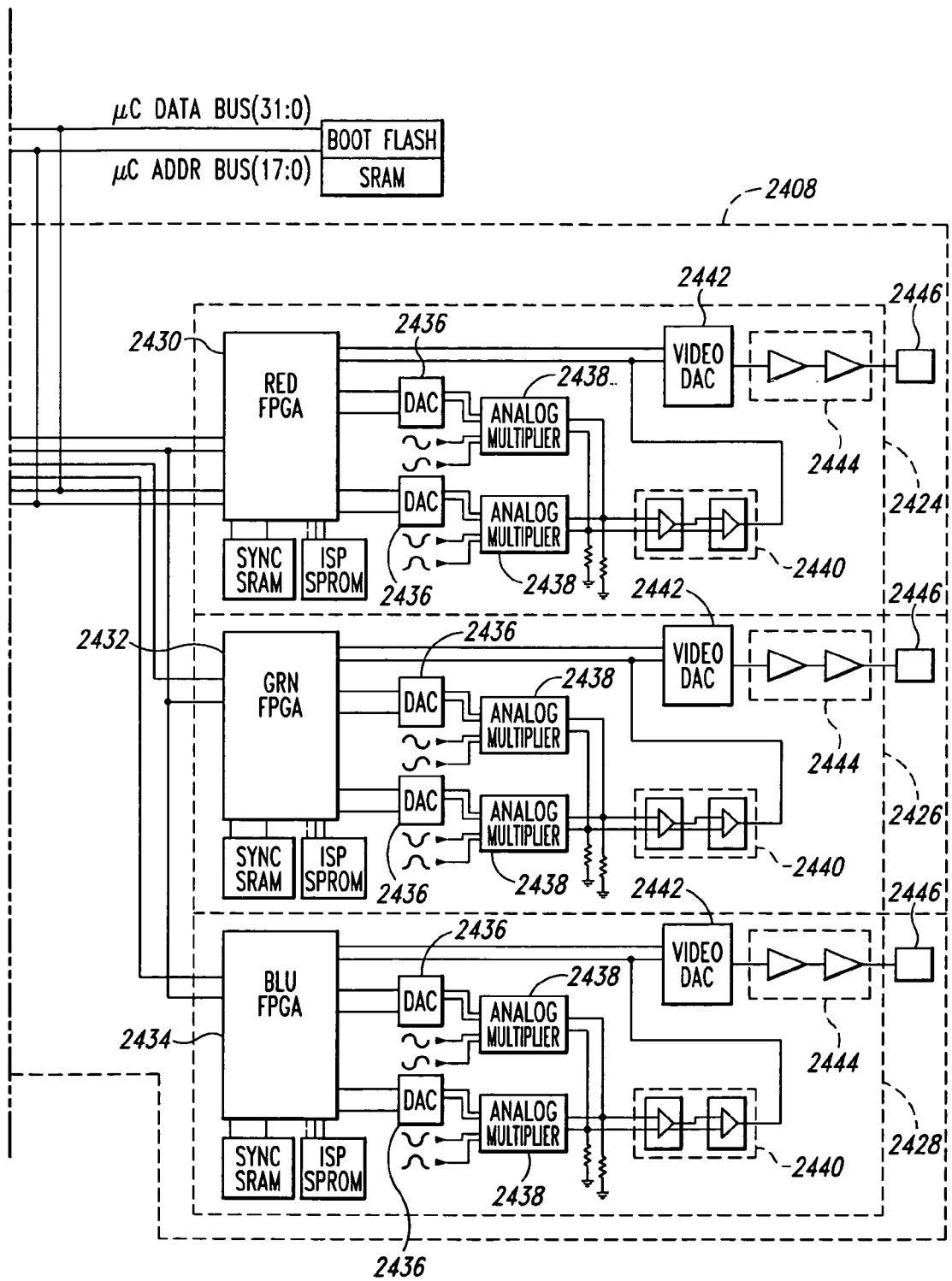

FIG. 24 is a block diagram of an alternative structure according to the invention, which controls timing of red, green and blue modulators in response to red, green, and blue components of the video signal. In this structure, a video front end 2402 receives a video signal that may be VGA, UXGA, and NTSC, S-video, or some other format. The video front end 2402 converts the input signal to a standard system format. The video front end 2402 drives a receiver 2404 that generates sync signals and red, green and blue components for a master FPGA 2406 in a video back end 2408.

The master FPGA controls DDSX 2410 and DDSY 2412 as described previously. The DDSY 2412 outputs sine and cosine components at the desired frequency and respective signal shaping filters 2414, 2416 to produce cleaned up versions of the sine and cosine components. Differential drivers 2418, 2420 produce complementary sinusoidal system clocks 2422 that drive red, green, and blue driver circuits 2424, 2426, 2428. The red, green, and blue driver circuits 2424, 2426, 2428 also receive red, green and blue signal components from the master FPGA 2406. As described previously, the red, green, and blue driver circuits include gamma correction, brightness compensation, and phase adjust hardware and software within respective FPGAs 2430, 2432, 2434.

Each of the FPGAs 2430, 2432, 2434 outputs digital data to a respective pair of DACs 2436 to produce phase correction signals. Respective pairs of multipliers 2438 in each of the red, green, and blue driver circuits 2424, 2426, 2428 multiply the phase correction signals by the complementary sine and cosine components of the sinusoidal system clocks. While the system uses a complementary pair of cosine and sine signals to control relative phase, the system can construct an appropriate phase relationship using Adder circuits 2440 within each of the red, green, and blue driver circuits 2424, 2426, 2428 produce phase corrected clock signals that are input to respective DACs 2442, along with the respective red, green, or blue component of the image signal.

Each of the DACs 2442 drives a respective AOM driver 2444 that, in turn, produces a frequency chirped, phase corrected drive signal that drives a respective AOM 2446. Responsive to the respective frequency chirped, phase corrected drive signal, each of the AOMs 2446 modulates a respective light source to produce a modulated red, green, or blue optical beam. The modulated beams are combined and scanned by the MRS, to produce the image, as described previously.

While the embodiments herein related primarily to scanned beam displays, the techniques, approaches and structures herein may be adapted for use in or applied to a variety of other applications.

While a variety of embodiments of a scanning imaging system have been described herein, one skilled in the art may implement the subject matter herein in a variety of manners. However, the scanning techniques described herein may relate to other image capture systems or to systems for displaying an image. Accordingly, the invention is not limited except as by the appended claims.

The invention claimed is:

1. A method for correcting the brightness of pixels in a displayed image in a scanned light display having a non-uniform light scanning velocity, comprising the steps of:
   receiving a pixel brightness multiplier;
   determining a pixel dwell time for a scanned beam of light;
   determining a corrected pixel brightness as a function of the pixel brightness multiplier and the pixel dwell time, wherein the step of determining a corrected pixel brightness as a function of the pixel brightness multiplier and the pixel dwell time includes determining the pixel brightness multiplier as a function of gamma; and
   outputting a signal corresponding to the corrected pixel brightness.

2. A method for correcting the brightness of pixels in a displayed image in a scanned light display having a non-uniform light scanning velocity, comprising the steps of:
   receiving a pixel brightness multiplier;
   determining a pixel dwell time for a scanned beam of light, wherein the step of determining a pixel dwell time includes selecting an approximate pixel dwell time, and wherein the step of selecting an approximate pixel dwell time includes selecting an approximate pixel dwell time from a group of approximate pixel dwell times as a function of the pixel position along a dimension scanned by the beam of light; wherein the number of groups of approximate pixel dwell times is less than the number of pixels along the dimension scanned by the beam of light;
   determining a corrected pixel brightness as a function of the pixel brightness multiplier and the pixel dwell time; and
   outputting a signal corresponding to the corrected pixel brightness.

3. The method of claim 2 wherein the approximate pixel dwell times within a group are non-constant.

4. The method of claim 2 wherein:
   each of the groups of approximate pixel dwell times includes a linear function of pixel position;
   each linear function forms a spline with at least one other group of approximate pixel dwell times; and
   the step of selecting an approximate pixel dwell time includes fitting the pixel position to the linear function.

5. The method of claim 4 wherein the splines together include a fit to a actual pixel dwell times as a function of pixel position.

6. A method for correcting the brightness of pixels in a displayed image in a scanned light display having a non-uniform light scanning velocity, comprising the steps of:
   receiving a pixel brightness multiplier;
   determining a pixel dwell time for a scanned beam of light;
   determining a corrected pixel brightness as a function of the pixel brightness multiplier and the pixel dwell time; and
   outputting a signal corresponding to the corrected pixel brightness, wherein the step of outputting a signal corresponding to the corrected pixel brightness further comprises:
   driving a digital-to-analog converter to produce an analog pixel voltage;
   amplifying the analog pixel voltage to produce a drive voltage; and
   driving a light emitter with the drive voltage to produce emitted pixel light corresponding to the corrected pixel brightness.

7. The method of claim 6 further comprising the steps of:
transmitting the emitted pixel light to a scanner; and
reflecting the emitted pixel light at an angle corresponding to the pixel position.

8. A method for correcting the brightness of pixels in a displayed image in a scanned light display having a non-uniform light scanning velocity, comprising the steps of:
receiving a pixel brightness multiplier;
determining a pixel dwell time for a scanned beam of light;
determining a corrected pixel brightness as a function of the pixel brightness multiplier and the pixel dwell time; and
outputting a signal corresponding to the corrected pixel brightness;
repeating the steps of:
receiving the pixel brightness multiplier;
determining a pixel dwell time for a scanned beam of light;
determining a corrected pixel brightness as a function of the pixel brightness multiplier and the pixel dwell time;
driving a digital-to-analog converter to produce an analog pixel voltage;
amplifying the analog pixel voltage to produce a drive voltage;
driving a light emitter with the drive voltage to produce emitted pixel light corresponding to the corrected pixel brightness;
transmitting the emitted pixel light to a scanner; and
reflecting the emitted pixel light at an angle corresponding to the pixel position to produce a brightness-corrected displayed image.

9. The method of claim 8 wherein driving a light emitter includes driving a plurality of light emitters operable to emit a corresponding plurality of wavelengths; and
wherein the plurality of light emitters are operable to produce a color displayed image.

10. A method for correcting the brightness of pixels in a displayed image in a scanned light display having a non-uniform light scanning velocity, comprising the steps of:
receiving a pixel brightness multiplier;
determining a pixel dwell time for a scanned beam of light;
determining a corrected pixel brightness as a function of the pixel brightness multiplier and the pixel dwell time, wherein the step of determining a corrected pixel brightness includes determining a gamma correction; and
outputting a signal corresponding to the corrected pixel brightness.

11. A scanned beam video display comprising:
an interface to receive a video image;
a correction processor coupled to the interface, the correction processor to modify pixel values in the received video image to compensate for variable pixel dwell time and produce a compensated video image comprising the compensated pixel values;
at least one light emitter;
an electronic drive circuit coupled to the correction processor and the at least one light emitter, the electronic drive circuit to drive the at least one light emitter to emit at least one compensated beam of light; and
a beam sweep mechanism to sweep the compensated beam of light over a field of view at a variable angular velocity to form a displayed video image formed from pixels having a variable dwell time.

12. The scanned beam video display of claim 11 wherein the beam sweep mechanism includes a beam scanner aligned to receive the at least one compensated beam of light and reflect the compensated beam of light toward the field of view.

13. The scanned beam video display of claim 11 wherein the beam scanner scans resonantly in at least one dimension.

14. The scanned beam video display of claim 11 wherein the beam scanner includes a MEMS scanner.

15. The scanned beam video display of claim 14 wherein the correction processor modifies the pixel values in the received video image to compensate for optical loss in the relay optics.

16. The scanned beam video display of claim 14 wherein the correction processor modifies the pixel values in the received video image to compensate for chromatic variation in the relay optics.

17. The scanned beam video display of claim 14 wherein the correction processor applies gamma correction to the pixel values in the received video image to produce a gamma-corrected video image.

18. The scanned beam video display of claim 11 further comprising relay optics to relay the swept compensated beam of light toward the field of view.

19. A method for displaying an image with a scanned beam display comprising the steps of:
receiving an image comprised of pels;
for a plurality of pels in the received image, determining a corresponding beam scanning velocity, wherein the step of determining a corresponding beam scanning velocity includes selecting an approximate beam scanning velocity from a group of approximate beam scanning velocities as a function of the pel position along a dimension scanned by the beam of light; wherein the number of groups of approximate beam scanning velocities is less than the number of pels along the dimension scanned by the beam of light; and
modifying the values of the plurality of pels to produce compensated pel values corresponding to the beam scanning velocity.

* * * * *